INVENTORS
Fred N. LaChapelle
Fred C. Eastman
By their Attorney

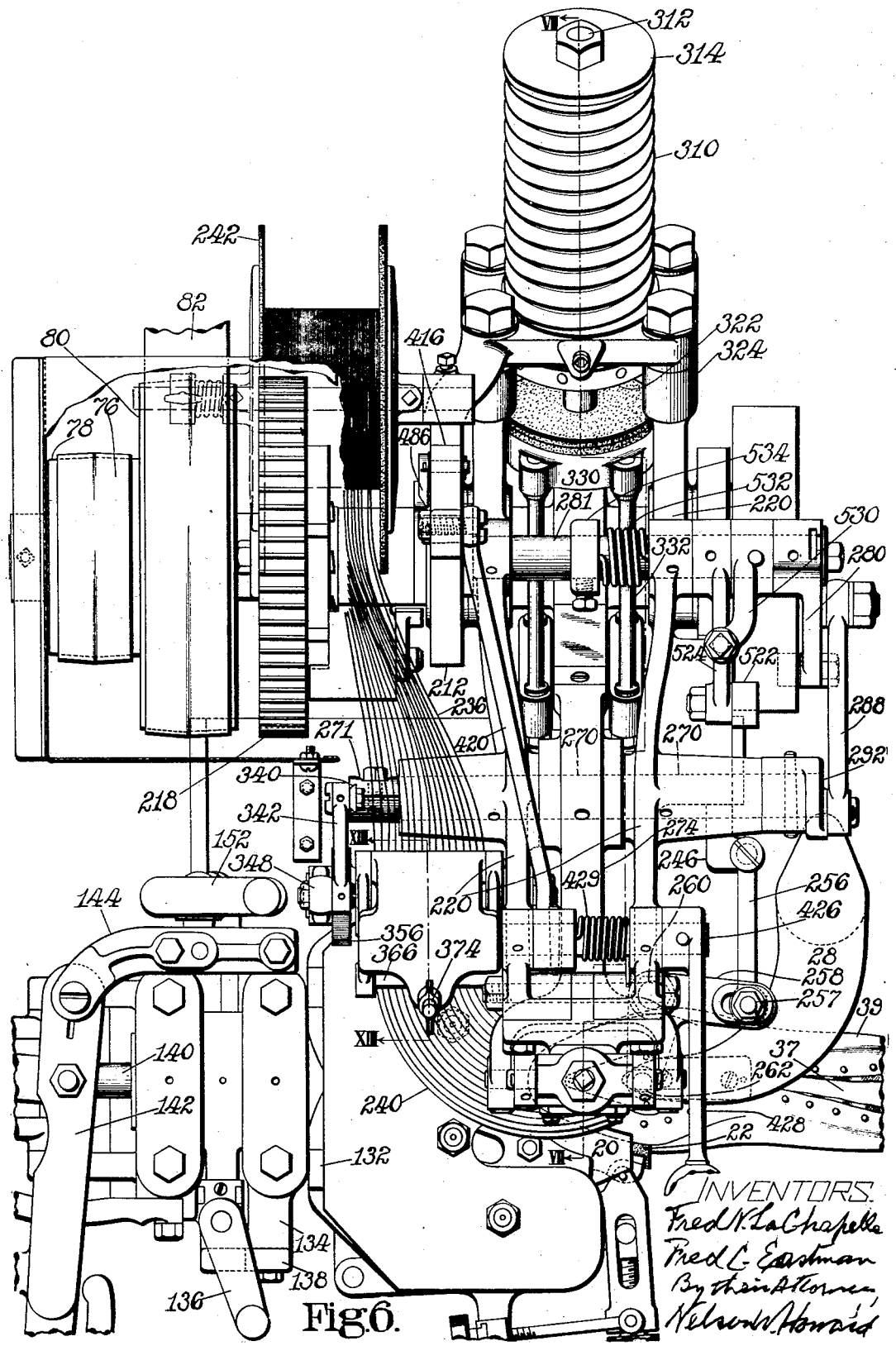

July 18, 1933.  F. N. LA CHAPELLE ET AL  1,918,274
LASTING MACHINE
Filed Feb. 20, 1930  9 Sheets-Sheet 7

INVENTORS
Fred N. La Chapelle
Fred C. Eastman
By Their Attorney,
Nelson H. Howard July 18, 1933.  F. N. LA CHAPELLE ET AL  1,918,274
LASTING MACHINE
Filed Feb. 20, 1930   9 Sheets-Sheet 8

INVENTORS.
Fred N. LaChapelle
Fred C. Eastman
By their Attorney
Nelson W. Howard

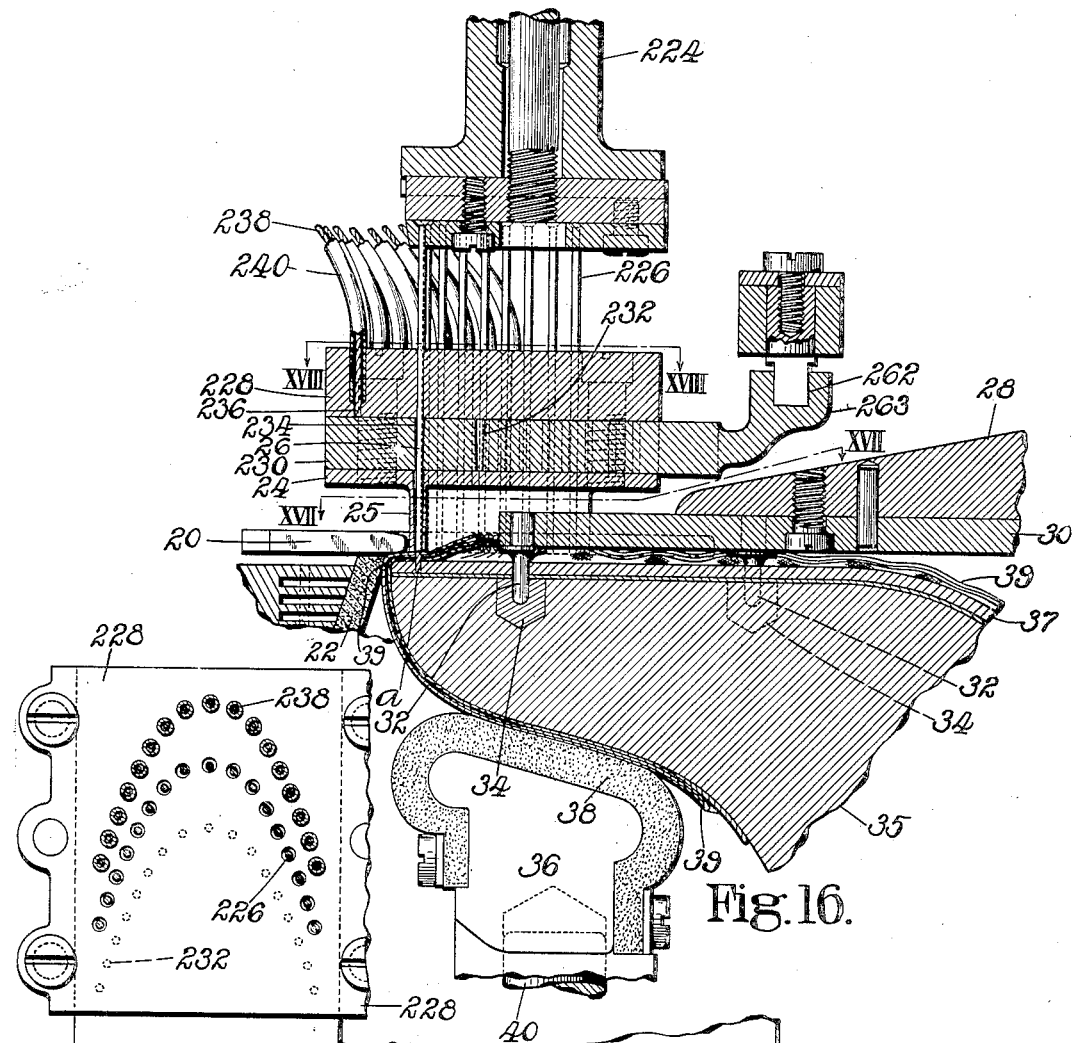
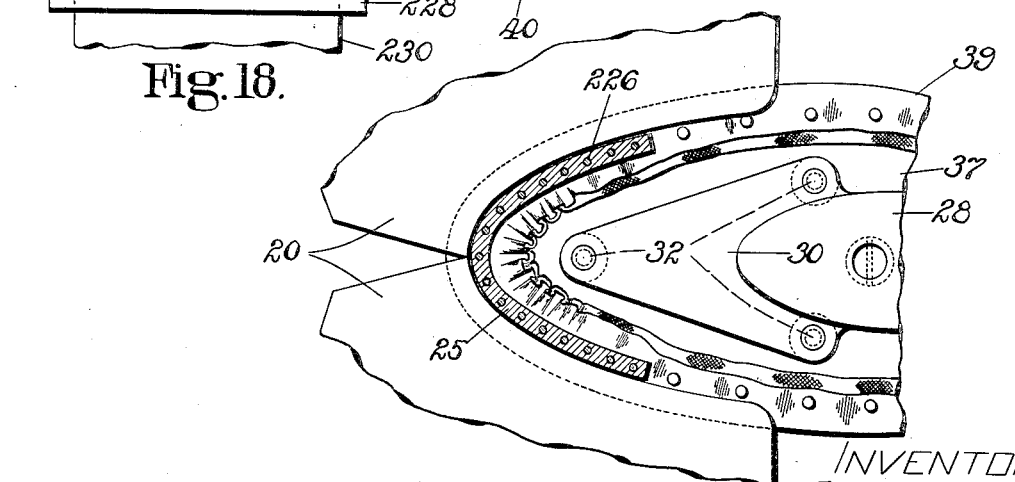
Fig. 16.
Fig. 18.
Fig. 17.

Patented July 18, 1933

1,918,274

UNITED STATES PATENT OFFICE

FRED N. LA CHAPELLE AND FRED C. EASTMAN, OF BEVERLY, MASSACHUSETTS, ASSIGNORS TO UNITED SHOE MACHINERY CORPORATION, OF PATERSON, NEW JERSEY, A CORPORATION OF NEW JERSEY

LASTING MACHINE

Application filed February 20, 1930. Serial No. 430,071.

This invention relates to machines for use in the manufacture of shoes and is illustrated herein as embodied in a lasting machine.

It is an object of the present invention to provide an improved lasting machine arranged to work a shoe upper into lasted relation to a last and insole and to insert fastenings through the marginal portion of the insole to secure the upper in lasted relation to the insole. The illustrated machine is arranged to operate at an end of the shoe, wiping the end portion of the shoe upper into lasted position and then inserting a row of fastenings through the upper into the insole to secure the end portion of the upper in lasted relation to the insole and last.

The machine herein disclosed is of the general type known as bed lasting machines and as illustrated in the drawings is arranged to be used in lasting the toe portions of shoes. It should be understood, however, that many of the features of the invention are not limited in their utility to embodiment in lasting machines of this type. Indeed various of the features may be utilized to advantage in fastening inserting machines used for performing other operations than lasting.

In accordance with an important feature of the invention the illustrated machine is provided with fastening inserting mechanism which is mounted for swinging movement with its operating means as a unit toward and from a work support and instrumentalities by which the upper is worked into lasted position, about a horizontal axis parallel with the longitudinal axis of the shoe and at substantially the level of the shoe, so that the fastening inserting mechanism can be maintained out of the way at a position remote from the shoe while the upper is worked into lasted relation to the last and insole and can thereafter be swung into operative relation to the shoe upper and insole to insert a row of fastenings to hold the upper in lasted relation.

In accordance with other features of the invention the illustrated machine is provided with a manually operable controller, shown as a hand lever, and connections from the controller to various parts of the machine such that a continuous movement of the controller is effective to cause the operation of the various mechanisms of the machine in a predetermined sequence. The head which carries the fastening inserting mechanism is normally latched in inoperative position and when the hand lever is displaced by the operator, after the shoe upper has been worked into lasted position, the latch is first released after which the operator, by further but continuous movement of the hand lever, swings the head into operative position. Further movement of the hand lever after the head reaches operative position is effective to trip a clutch. This first applies pressure to force the fastening inserting instrumentalities firmly against the shoe on the work support and locks the head in that position after which the fastening inserting instrumentalities are operated to insert fibre pegs through the overlasted marginal portion of the upper and into the insole. While the illustrated machine embodies all the features recited in this paragraph it should be noted that various of these features may be incorporated in machines which do not embody all of them and that such is within the scope of the invention.

Other features of the invention relate to the fastening inserting mechanism and its relation to the means for working the shoe upper into lasted position. For example, the fastening inserting mechanism, as illustrated, includes an approximately U-shaped rib shaped to conform substantially to the edge of the wipers by which the upper is worked into lasted position. This rib is effective to engage and hold the overlasted marginal portion of the upper inside of but adjacent to the edge of the wipers after the upper has been worked into lasted position, and is provided with a row of driver passages through which the drivers are reciprocated to insert a series of fastenings to hold the upper in lasted position.

In order to provide a simple and compact means for controlling the operation of the fastening inserting tool of the machine, another feature of the invention comprises mechanism which, as illustrated, comprises a bell-crank lever by the rocking of which the fastening inserting tools are reciprocated, and an eccentric by movement of which the position of the fulcrum point of that lever is changed, thereby controlling the stroke of the fastening inserting tools according as they are to act as awls or as drivers.

With the above and other objects and features in view the invention will now be described with respect to the accompanying drawings which illustrate a preferred embodiment of the invention and pointed out in the claims.

In the drawings,

Fig. 6 is a plan view showing principally the head of the machine in fastening inserting position;

Figs. 14 and 15 are sectional views on the lines XIV—XIV, XV—XV of Fig. 13;

Fig. 16 is a longitudinal section through the forward portion of a shoe which has been presented to the machine and through a portion of the fastening inserting instrumentalities of the machine while the latter are in their operative or fastening inserting position; and Figs. 17 and 18 are horizontal sections on the lines XVII—XVII, XVIII—XVIII, respectively, of Fig. 16.

General organization

Figure 4:
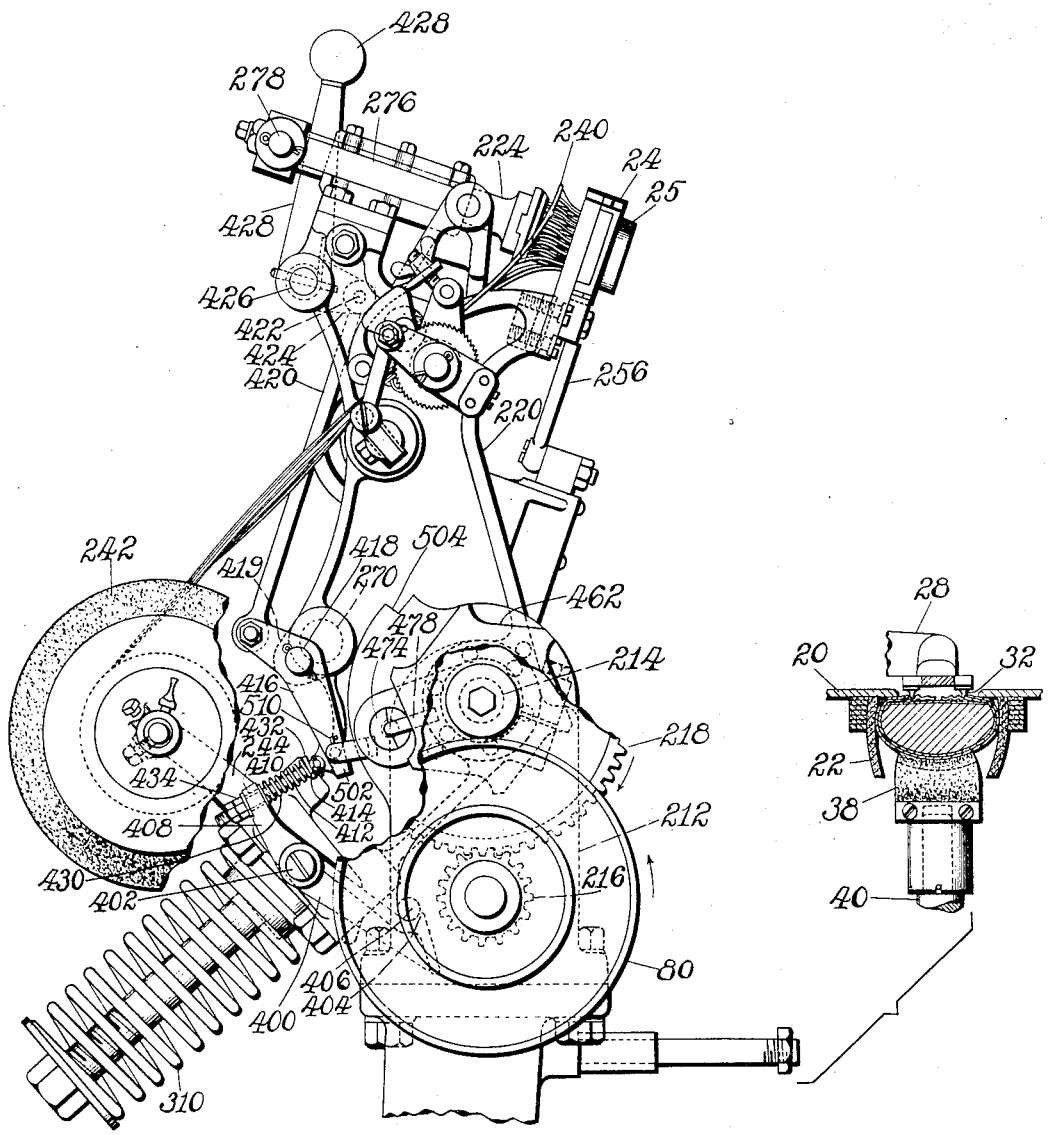
Figs. 4 and 5 are side elevations of the head of the machine looking from the left, as viewed in Fig. 1, Fig. 4 showing the head as swung upwardly and to the rear into its normal inoperative position and Fig. 5 showing the head in its fastening inserting or operative position.
Figure 5:
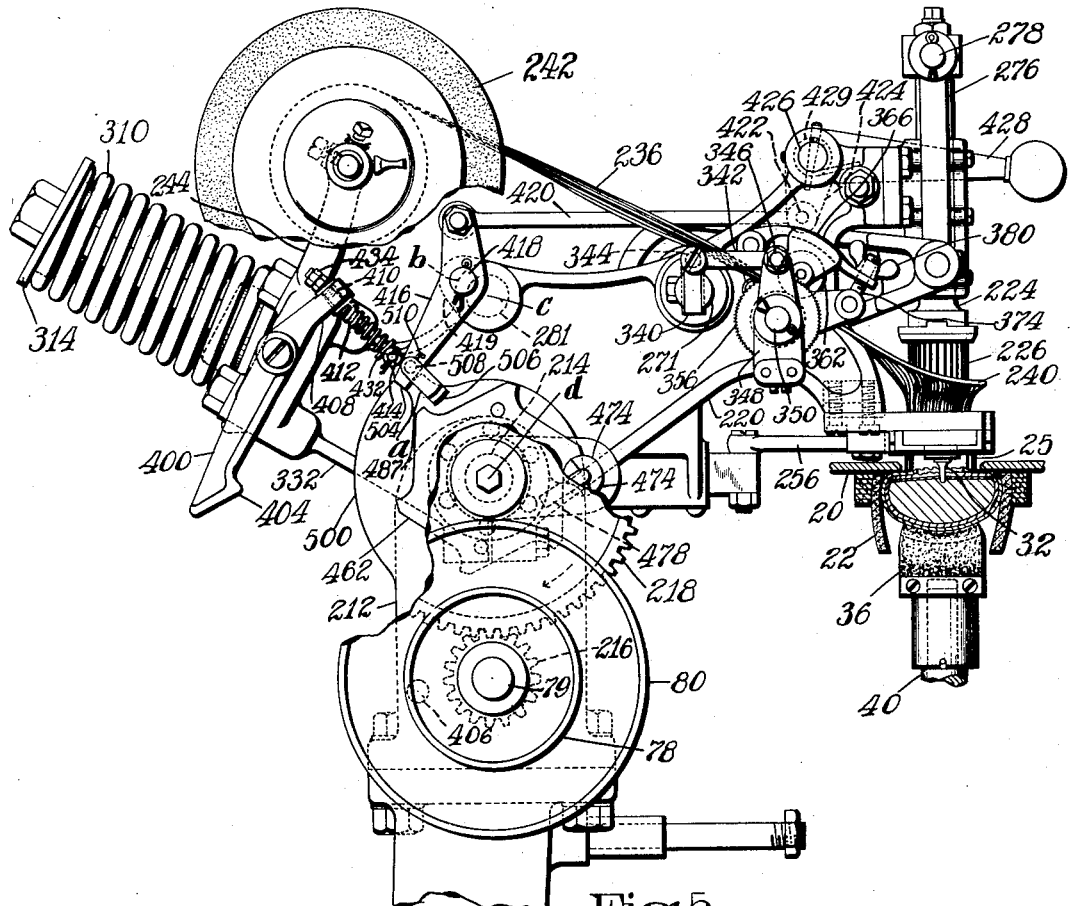

The illustrated machine includes lasting mechanism for working an end portion of a shoe upper into lasted relation to a last and insole carried by a work support with which the machine is provided and with fastening inserting mechanism arranged to be maintained in an inoperative position remote from the work support, as illustrated in Fig. 4, while the shoe upper is worked into lasted position and then to be swung into operative position, as shown in Fig. 5, while the fastenings are inserted. The illustrated machine, it will be observed, has been arranged particularly for the lasting of the toe ends of shoes though it will be clear that the invention is in no way limited to embodiment in machines for operating upon that portion of shoes.

For lasting the toe ends of shoes, the machine includes in its general organization toe-embracing wipers 20 (Figs. 4, 5, 8, 16 and 17) which are operated to wipe the upper heightwise of the toe and are then advanced and closed to wipe its marginal portion inwardly over an insole on the last, a toe band 22 co-operating with the wipers to shape the upper around the toe and hold it until it has been fastened to the insole, and upper-fastening mechanism including a presser plate 24 (Fig. 16) having a substantially U-shaped rib 25 which is moved into engagement with the upper beyond or in front of the edges of the wipers 20 and closely adjacent thereto after the wipers have been partially retracted from their innermost wiping positions, this member serving as a guide for a plurality of fibre pegs a and for a plurality of drivers 226 which are operated to punch holes through the upper and the insole and to drive the pegs into the holes to fasten the upper to the insole. These various parts and the means for operating and controlling them will be more particularly hereinafter described.

The work supporting and positioning means

In the machine herein shown the position of the last 35 and the insole 37 and shoe upper 39 carried thereby relatively to the lasting means is determined in the same general manner and by means of the same general character as disclosed in United States Letters Patent No. 1,674,060, granted on June 19, 1928, upon an application filed in the name of Arthur F. Pym. For this purpose there is fixed on the frame of the machine an arm 28 (Figs. 1, 6 and 16) to which is secured a plate 30 provided with three pins 32 (Fig. 16) arranged to project through holes in the insole 37 and into sockets formed in metal bushings 34 which are fixed in the bottom portion of the last 35. These pins, accordingly, determine the position of the last and shoe with respect to lengthwise or lateral bodily movements and with respect to lateral swinging movement, and in cooperation with the bushings 34 they also determine the plane in which the bottom face of the toe end of the insole is presented for the lasting operation, the lower end faces of the pins engaging the bushings for this purpose, all as fully described in the above-mentioned Letters Patent.

For maintaining the last and shoe in the position determined by the pins 32 and for supporting it against pressure applied on the bottom of the shoe in the lasting operation, the machine is provided with a toe rest 36 (Figs. 8 and 16) faced with a layer 38 of felt or other material suitable for engagement with the shoe upper 39 on the top of the forepart, this toe rest being mounted on the upper end of a rod 40 which is vertically movable in an upper fixed bearing 42 and a lower bearing formed in a bracket 44 (Fig. 8) which is fast on the frame of the machine. It will be understood that initially the toe rest 36 is in a lower position than indicated in the drawings, to permit the last and shoe to be mounted on the pins 32, and that it is moved upwardly into supporting engagement with the shoe. For imparting such upward movement to the toe rest and its supporting rod 40, there is provided a sleeve 46 (Figs. 1 and 8) which is slidingly movable on the rod 40 and acts through a spring 48 in engagement with a collar 50 fast on the rod to raise the rod and the toe rest and to force the toe rest yieldingly against the shoe. The sleeve 46 bears at its upper end on a collar 51 slidingly mounted on a reduced portion of the rod 40 and engaging the lower end of the spring 48, this collar being arranged to engage a shoulder 52 on the rod when the parts are in starting positions so that the spring 48 is at that time under a substantial amount of compression between the collars 50 and 51. The sleeve 46 is connected by links 53 at its opposite sides to the forked end of a lever 54 pivoted at 56 on a bracket 58 carried by the frame of the machine, and the other end of this lever is connected by a link 60 to a crank pin 62 carried by a gear wheel 64 on a shaft 66.

Figure 1:
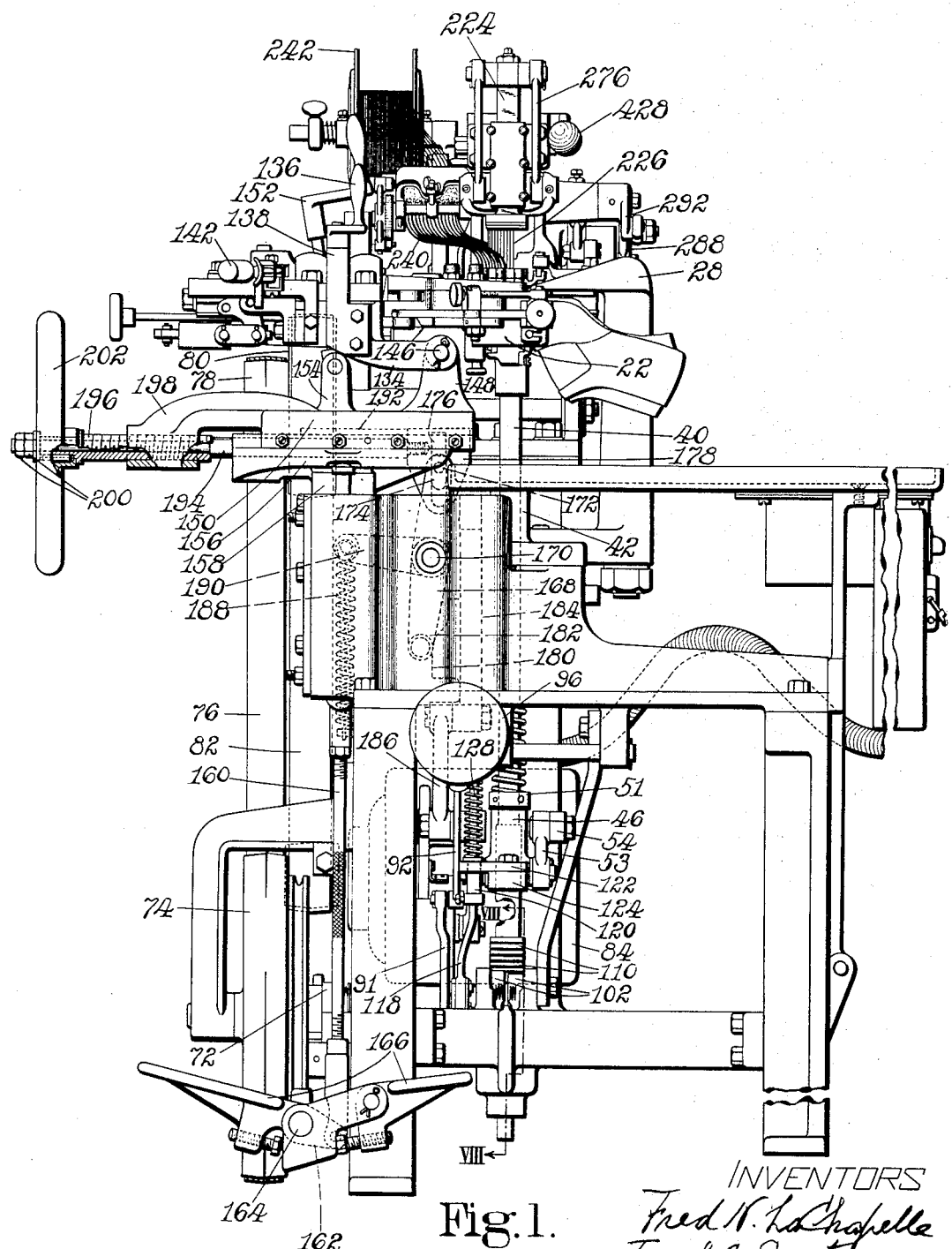
Fig. 1 is a front elevation of a lasting machine embodying the present invention.

The gear wheel 64 is operated by a pinion 68 on a shaft 70, the construction being such that the gear wheel 64 turns through a half revolution in each complete revolution of the pinion 68. The pinion 68 is operated through a clutch 72 by a pulley 74 driven through a belt 76 (Figs. 1 and 6) by a smaller pulley 78 (Figs. 1 and 5), the pulley 78 being mounted on a shaft 79 and rigidly connected thereby to another pulley 80 driven through a belt 82 by an electric motor 84 (Fig. 1). It will thus be seen that the pulley 74 is driven continuously. The clutch 72 is controlled by a wedge member 86 (Fig. 8) mounted on an arm 88 which is fast on a rock shaft 89, this arm being controlled by a spring 90 which acts normally to maintain the wedge member 86 in position to disconnect the parts of the clutch.

For swinging the arm 88 to actuate the clutch there is fast on the rock shaft 89 an arm 91 connected to a rod 92 which is slidingly mounted in a bearing 94 on the frame, this rod having on its outer end a member 96 in position to be engaged by the knee of the operator. It will be understood that when the operator pushes on the member 96 the clutch is actuated to connect the pulley 74 to the pinion 68, whereupon the gear wheel 64 is turned through a half revolution, the operator releasing the member 96 soon enough to cause the wedge member 86 to return into position to disconnect the pulley 74 from the pinion 68 at the end of one revolution of the pinion. Accordingly, the toe rest 36 is forced upwardly into engagement with a shoe upon one actuation of the clutch, and is thereafter lowered to its starting position upon a second actuation of the clutch after the lasting operations have been performed on the shoe.

It will be evident that in order to secure throughout the lasting operation the full advantage of the exact positioning of the last and shoe in relation to the plane of the wipers 20 by the pins 32 and the bushings 34, it is necessary to hold the last firmly up in the position determined by the ends of the pins against any tendency for it to tip in response to the pressure applied over the bottom of the shoe, and it is also necessary, as will be more fully understood hereinafter from a description of the upper-fastening mechanism, that the shoe be supported firmly against downward yield in the fastening-inserting operation. There is accordingly provided means for holding the rod 40 positively against any downward movement from the position to which it is raised in forcing the toe rest against the shoe. For the purpose in view there is secured on the lower end portion of the rod 40 a member 98 (Fig. 8) provided with a series of downwardly facing ratchet teeth 100 arranged to co-operate with a plurality of pawls 102 supported on the bracket 44. The member 98 is mounted on a reduced portion of the rod 40 so that it bears at its upper end against a shoulder on the rod, and it is secured in place by set screws 104. As illustrated, the pawls 102 are four in number, arranged in upper and lower pairs, and they are also arranged in staggered relation so that in any position assumed by the rod 40 at the end of its movement to carry the toe rest into supporting engagement with a shoe, regardless of the size of the shoe, some one of the pawls will be positioned in fairly close relation to the lower end face of one of the ratchet teeth. In order still further to insure against the possibility of any lost motion between the pawls and the ratchet teeth such as to permit downward yield of the toe rest when pressure is applied on the bottom of the shoe, there is further provided means for controlling the pawls in such manner as to insure that one of them will be positioned in holding relation to one of the ratchet teeth to support the toe rest against any downward yield. For the purpose in view each of the pawls of both the upper and the lower pair are swiveled on an eccentric 106 which is part of a rock shaft 108 mounted in bearings in the bracket 44. The two pawls of each pair are connected by coiled springs 110 to one end of the head of a T-shaped pin 112 which is fast in the shaft 108 and projects through a slot 113 formed partly in the side of the hub of each pawl. The springs 110 thus serve as yielding connections through which the pawls are swung toward and from the ratchet teeth by turning movement of the shaft 108, and the slot 113 permits the shaft to turn relatively to the pawls after they have been swung into engagement with the ratchet teeth. Each of the shafts 108 is provided with a crank arm 114, and these two crank arms are pivotally connected to a pair of links 116, so that the two shafts are turned in unison. The links 116 are pivotally connected at their upper ends to the lower end of a rod 118 which extends upwardly through a thimble 120 slidingly mounted on the rod, this thimble being loosely mounted in an opening formed in a plate 122 secured to an arm 124 which projects from the sleeve 46 and having at its upper end a flange 125 for engaging the plate 122. Between the thimble 120 and a collar 126 fast on the upper end of the rod 118 is a spring 128. Below the thimble is a collar 130 which is fast on the rod 118.

Figure 8:
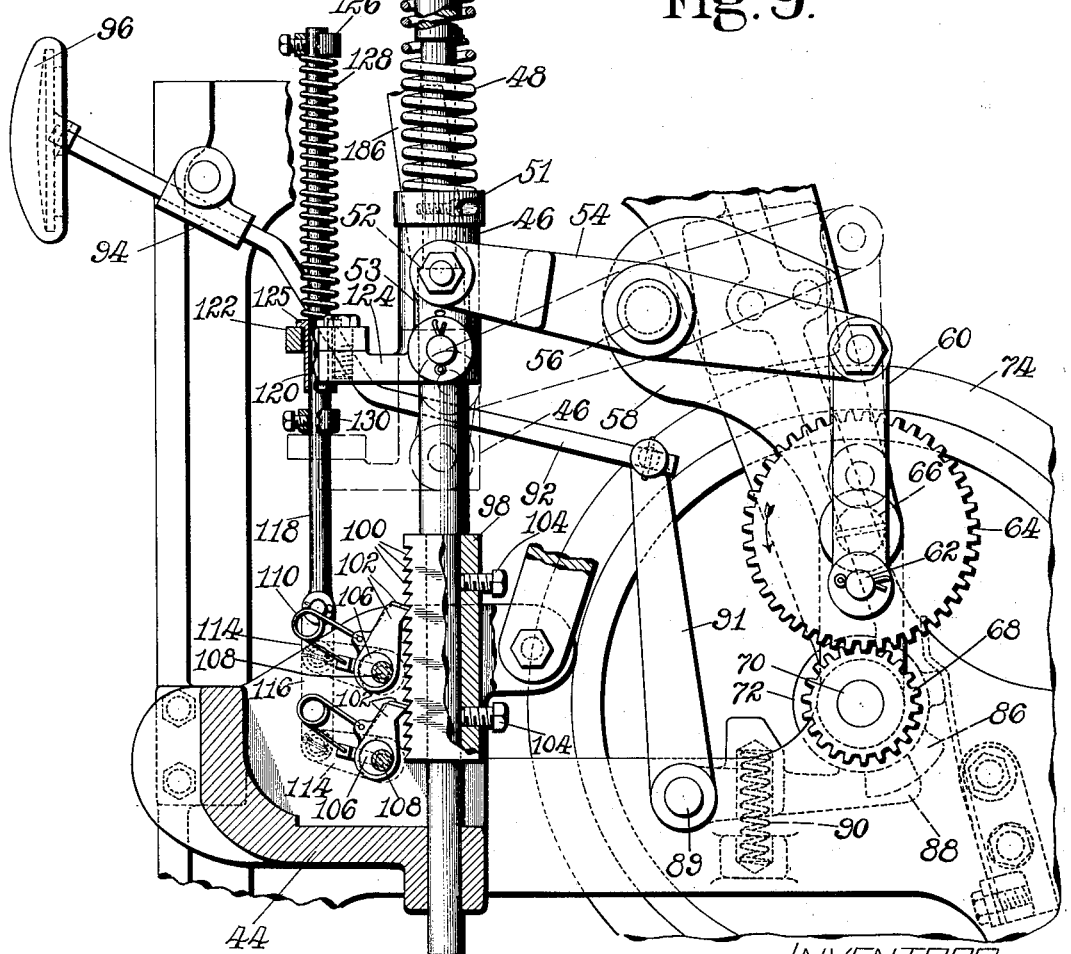
Fig. 8 is a sectional view of a portion of the work support controlling mechanism taken on the line VIII—VIII of Fig. 1 but a larger scale.

When the parts are in starting positions with the toe rest lowered and the sleeve 46 positioned as indicated by dotted lines in Fig. 8, the thimble 120 rests upon the collar 130 with the spring 128 under some compression and the plate 122 is positioned considerably below the flange 125 on the upper end of the thimble 120. At that time the rod 118 is in such a position that the pawls 102 are swung outwardly away from the series of ratchet teeth by engagement of the pins 112 with the hubs of the pawls at the lower ends of the slots 113. When the sleeve 46 is moved upwardly by the lever 54 to force the toe rest against the shoe, the plate 122 first slides upwardly along the thimble 120 without affecting the positions of the pawls 102. Substantially at the time when the spring 48 begins to yield in response to the upward movement of the sleeve 46, the plate 122 engages the flange 125 at the upper end of the thimble 120 and acts through the spring 128 to lift the rod 118, thereby turning the rock shafts 108. As the shafts are thus turned, the pawls 102 are swung into operative relation to the ratchet teeth through the yielding connections provided by the springs 110, the eccentrics 106 being turned with the shafts, and in the latter part of the turning movements of the shafts the eccentrics are carried to such positions that they impart to the pawls upward movements lengthwise of the series of ratchet teeth 100, thus insuring that the pawl which is nearest to the lower face of a ratchet tooth will be carried into holding engagement with that tooth thereby serving as an abutment to prevent any downward movement of the rod 40. In any further upward movement of the sleeve 46 that may take place after one of the pawls has thus been seated against a ratchet tooth the spring 128 will yield, the thimble 120 being carried upwardly away from the collar 130, as indicated in Fig. 8. It will be understood that after one of the pawls has thus been seated firmly against one of the ratchet teeth, its controlling eccentric 106 is in such a position as to act as a positive abutment to prevent any downward movement of the pawl in response to the pressure of the shoe on the toe rest 36. Insurance is thus afforded that the shoe will be maintained firmly in the position determined by the pins 32 and will be supported against any downward yield in response to the pressure applied on its bottom face in the overwiping and fastening-inserting operations. It will be understood that in the return of the parts to starting positions the pawls 102 are swung outwardly away from the ratchet teeth 100 by the lowering of the rod 118, so as to release the rod 40 for downward movement to carry the toe rest away from the shoe.

The means above described for insuring against downward yield of the toe rest is not claimed herein, since it is the sole invention of Fred C. Eastman and is claimed in a copending application Serial No. 430,048, filed on February 20, 1930.

*The wiper mechanism*

Figure 2:
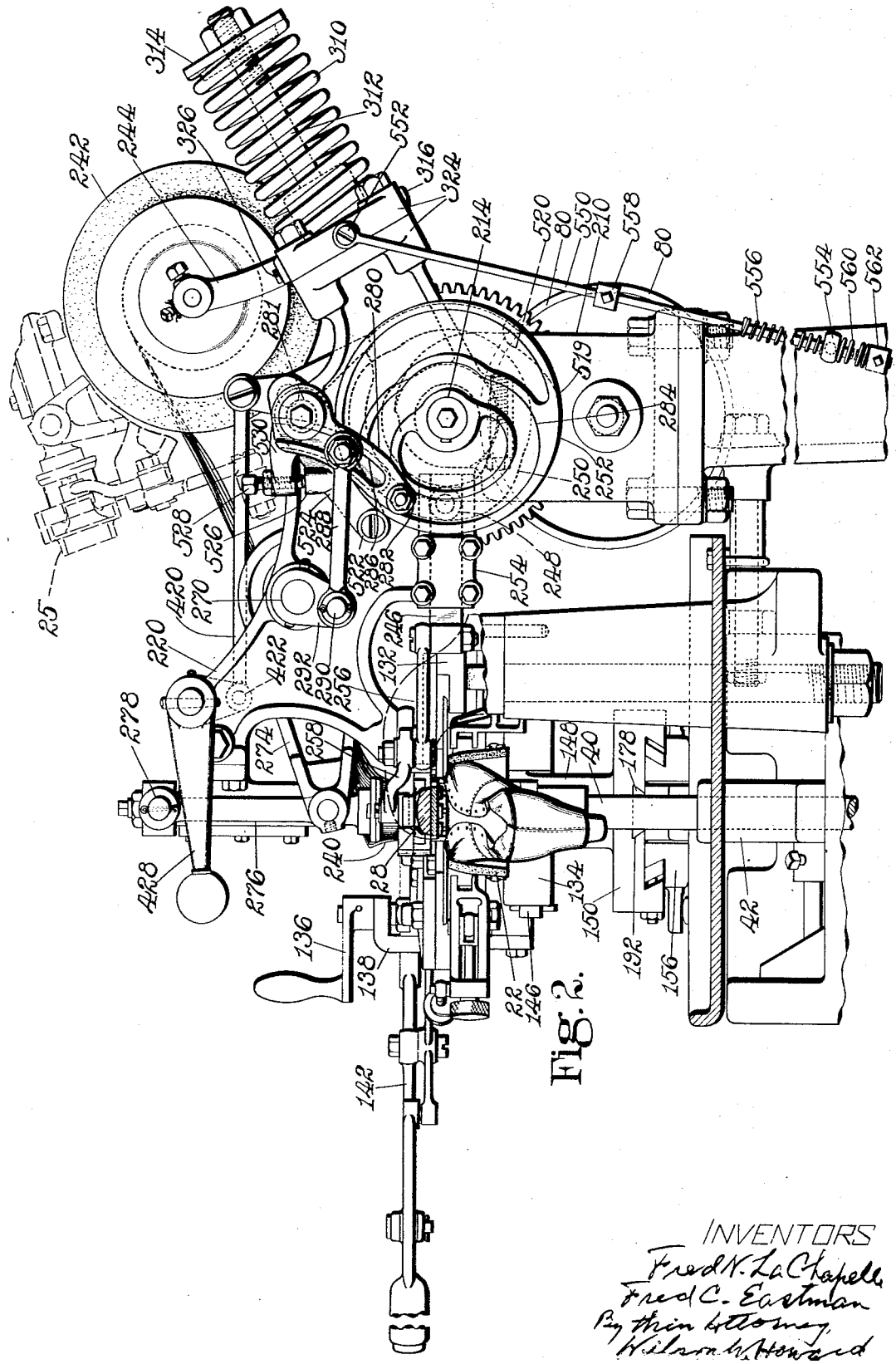
Fig. 2 is a side elevation of the upper portion of the machine on a larger scale than Fig. 1, looking toward the machine from the right as viewed in Fig. 1, and showing the swinging head of the machine in fastening inserting position.
Figure 3:
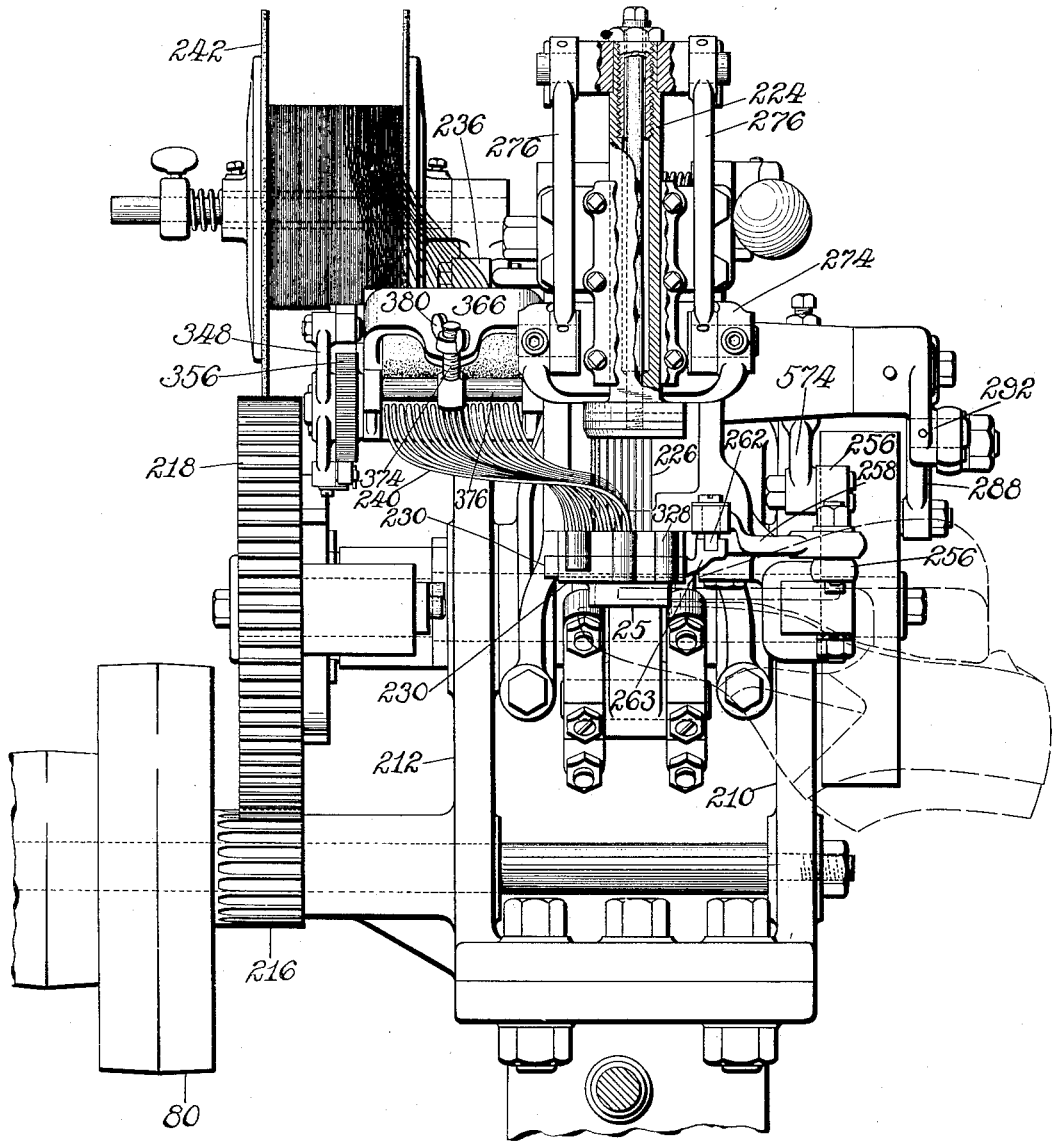
Fig. 3 is a front elevation of the head of the machine on a still larger scale.

The toe-embracing wipers 20 are supported, operated and controlled by means which in many respects is of the same character as that disclosed in Letters Patent No. 1,018,477, granted on February 27, 1912, upon an application of Matthias Brock, and of which accordingly only a brief description is necessary. The wipers are mounted in a wiper holder 132 (Figs. 2 and 8) which is supported on a wiper head 134 (Fig. 1) to turn relatively to the wiper head about an axis extending lengthwise of the shoe and thus to tip the wipers laterally to adjust them in proper relation to the plane of the toe end portion of the shoe bottom, the tipping movement being effeced by mechanism including a hand crank 136 supported by a bracket 138 fast on the head 134. The wipers 20 are advanced lengthwise of the shoe and are closed laterally of the shoe by mechanism of the same general character as disclosed in the above-mentioned Letters Patent, including a plunger 140 operated by a hand lever 142 which is pivoted at one end on an arm 144 fast on the wiper head 134. The toe band 22 is supported by the wiper holder 132 underneath the wipers and is operated and controlled by the hand lever 142 through connections of the same general character as disclosed in Letters Patent No. 1,495,169, granted on May 27, 1924 upon an application filed in the names of Joseph Fausse and René E. Duplessis, which may be referred to for a more complete understanding of the details. It will be understood that the connections for operating the wipers and the toe band are such that the wipers may be advanced and closed about the toe below the shoe bottom to position them for wiping the upper heightwise of the toe while the toe band is out of contact with the shoe, and that as the wipers are advanced and closed to wipe the upper inwardly over the shoe bottom the toe band is pressed closely against the upper all around the toe to assist in shaping the upper and in holding it during the overwiping and fastening operations.

Similarly also to the disclosure of Letters Patent No. 1,018,477, the wiper head 134 is mounted on a rod 146 to swing about an axis extending widthwise of the shoe for adjusting the wipers further in proper relation to the plane of the toe end of the shoe bottom, this rod being supported on a lug or bracket 148 projecting upwardly from a slide 150 which is movable lengthwise of the shoe as and for a purpose hereinafter described. The adjustment of the wiper head 134 about the axis of the rod 146 is effected by mechanism including a hand crank 152 supported by a lug 154 on the slide 150. The slide 150 is mounted and guided for movements lengthwise of the shoe on a support 156 which is fast on the upper end of a slide 158 mounted for vertical movements in guideways in the frame of the machine, the lower end of this slide being connected by a rod 160 to a crank arm 162 fast on a rock shaft 164 upon which is mounted a double acting treadle 166. Accordingly, by means of the treadle 166, the operator is enabled to raise and lower the slide 158 as desired, for imparting to the wipers 20 upwiping movements heightwise of the toe and for also pressing them down firmly upon the upper over the bottom face of the insole in the overwiping operation.

In view of the character of the means herein shown for positioning the last and shoe, comprising the pins 32, it is desirable that the wipers and the toe band be retracted well away from the position occupied by the toe portion of the shoe at the time when the operator presents the shoe in position to be operated upon, in order to facilitate such presentation of the shoe. The machine is accordingly provided with power-operated means for moving the slide 150 and the parts supported thereon toward and from the shoe. This means comprises a lever 168 (Fig. 1) pivotally mounted at 170 on the frame of the machine and carrying on its upper end a pin 172 on which is swiveled a block 174 mounted in a vertical guideway 176 formed in a member 178 which is connected by means hereinafter described to the slide 150. The lever 168 is controlled by a cam 180 in engagement with a roll 182 on the lower end of the lever, this cam being formed on a slide 184 vertically movable in the frame of the machine and connected by a link 186 to one arm of the forked lever 54 hereinbefore described as a part of the means for raising the toe rest 36. It will accordingly be understood that when the toe rest is raised into clamping relation to the shoe, the lever 168 also is operated to move the wipers and the toe band from their retracted positions into positions close to the toe of the shoe ready to be operated manually by means hereinbefore described. The wipers and the toe band are thus moved forwardly toward the shoe against the resistance of a spring 188 connected at one end to the frame of the machine and at its other end to an arm 190 secured to the lever 168. It will be evident that this spring acts to return the slide 150 and the parts thereon to their retracted positions when the cam 180 is moved downwardly after the lasting of the toe has been completed. It will further be understood that the slot 176 in the member 178 is of sufficient length to permit the raising and lowering of the slide 158 by the treadle 166 for the purpose hereinbefore described.

The member 178 is connected to the slide 150 by mechanism such as to permit a manual adjustment of the slide for varying the limit of the movement of the wipers and the toe band toward the shoe. For the purpose in view the member 178 is mounted in a guideway 192 (Figs. 1 and 2) formed in the lower face of the slide 150 so that the slide can be moved relatively to this member lengthwise of the shoe, and secured at one end to the member 178 is a rod 194 which projects outwardly through a sleeve 196 threaded in a bracket 198 projecting from the slide 150. The sleeve 196 is mounted on a reduced portion of the rod 194 to turn thereon, and accordingly abuts at one end against a shoulder on the rod, and at its other end it is held against lengthwise movement on the rod by nuts 200. Fast on the sleeve 196 is a hand wheel 202. It will thus be seen that by turning the hand wheel 202 the slide 150 may be adjusted lengthwise of the shoe relatively to the member 178, and that in the power-effected movements of the slide 150 the hand wheel and the rod 194 move with the slide whatever may be the relative adjustment of the parts.

*The fastening inserting mechanism*

After the shoe upper has been worked into lasted relation to the insole and last the wipers 20 are retracted slightly, for example to the position shown in Figs. 16 and 17, and the fastening inserting mechanism is brought into position and operated to insert a row of fastenings through the overlasted portion of the shoe upper 39 into the insole 37 to secure the parts in lasted relation. The mechanism by which this is done will now be described.

The rear portion of the frame of the machine is provided with an upstanding column comprising a pair of parallel plates 210, 212 in the upper portions of which is journaled the main cam shaft 214 of the fastening inserting mechanism (see particularly Figs. 2, 5, 7 and 10). This shaft is rotated under the control of the operator from the shaft 79 through gearing 216, 218 and clutch mechanism, illustrated particularly in Figs. 4, 5, 10, 11 and 12 and hereinafter more fully described.

Pivoted for swinging movement about the shaft 214 which, it will be observed, is at approximately the same height as the shoe which is being operated on, is a swinging head 220 which is maintained remote from the work support (the toe rest 36 and the pins 32) and the shoe operated on in the position shown in Fig. 4 while the shoe is presented to the work support and the shoe upper worked into lasted position after which the head 220 is swung by the operator into fastening inserting position, as shown in Fig. 5.

Figure 7:
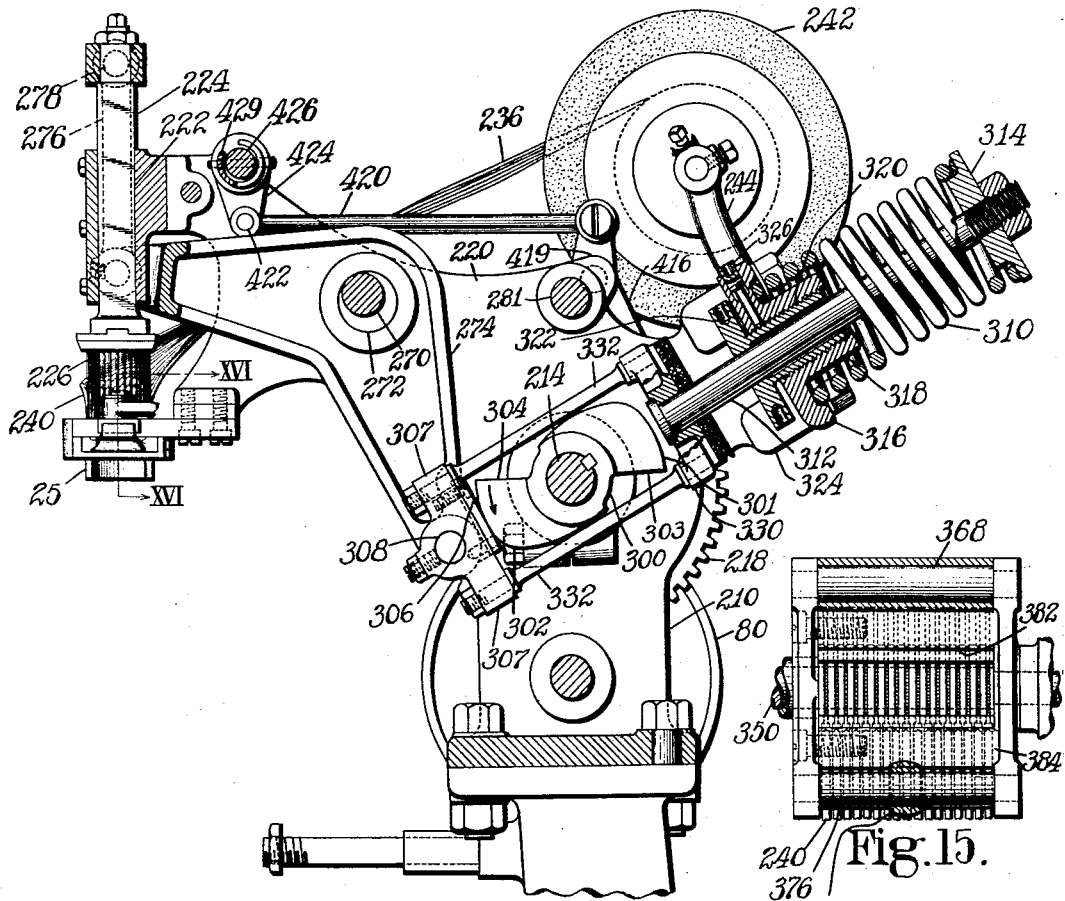
Fig. 7 is a sectional view through the head of the machine looking from the right as the machine is viewed in Fig. 1 and taken substantially on the line VII—VII of Fig. 6.
Figure 14:
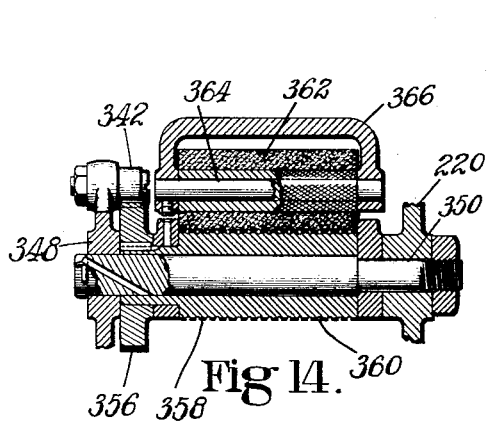

Viewing the fastening inserting mechanism in the position in which it is shown in Figs. 5 and 7, the head 220 is provided at its forward portion with a slideway 222 in which there is mounted for sliding movement a tool carrier or driver bar 224 to the lower end of which is secured a row of tools 226 constituting part of a gang fastening inserting mechanism and acting alternately as awls and as drivers, and hereinafter as a matter of convenience frequently termed drivers. These drivers 226 are arranged in an approximately U-shaped row conforming to the outline of the portion of the shoe to be operated on. Secured to the swinging head 220 in co-operative relation to the drivers 226 is a foot-plate 228 (Figs. 16 and 18) provided with a series of driver passages positioned in alinement with the drivers 226. The foot-plate 228 serves also as a support for the presser plate 24 from which the rib 25 depends. Slidably mounted between the foot-plate 228 and the presser plate 24 is a loader-block 230 which is provided with two rows of driver passages 232, 234.

When the loader-block is in its right-hand position, as shown in Fig. 16, its driver passages 234 are in alinement with the driver passages of the foot-plate 228 and those of the presser member 24, and this is the position which the parts occupy at the time the fastenings are inserted. When, however, the tools 226 are operated to serve as awls the loader-block is positioned further to the left, so that the driver passages 232 are in alinement with the driver passages of the foot-plate 228 and the presser plate 24. At this time the driver passages 234 are in alinement with a similarly arranged row of passages 236 formed in the foot-plate 228 each of which receives the end of a strip 238 of fibre fastening material guided thereto through a conduit tube 240. As illustrated herein the various strips of fibre fastening material 236 are wound upon a single reel 242 carried by a bracket 244 secured to the swinging head 220, from which reel the fastening material 236 is fed to the loader-block 230 by mechanism shown particularly in Figs. 5, 13, 14 and 15 and more fully described hereinafter.

The loader-block 230 is reciprocated from one position to the other through mechanism operated from the main cam shaft 214 and comprising a slide member 246 (Figs. 2 and 6) carrying a cam roll 248 operating in a cam groove 250 formed in a cam member 252 secured to the shaft 214, the member 246 being guided by a slideway formed in a bearing cap 254 secured to the head 220. Pivoted to the forward end of the slide member 246 is a link 256 adjustably pivoted in turn at 257 to one arm of a bell crank lever 258 fulcrumed at 260 to the head 220. The other arm of the bell crank lever 258 carries a pivot pin 262 the lower end of which engages, as shown in Fig. 16, in a slot formed in an extension 263 of the loader-block 230, so that the loader-block 230 is reciprocated in timed relation to the other parts of the fastening inserting mechanism as the shaft 214 is rotated. When the loader-block is in its left hand position, and at substantially the same time that the drivers 226 are operated as awls to form fastening receiving holes in the shoe upper and insoles, the strips 238 of fibre fastening material are fed by the mechanism of Figs. 13, 14 and 15 so that portions of appropriate length to serve as fastenings protrude into the passages 234 of the loader-block 230 and when the loader-block is returned to fastening inserting position, after the drivers 236 have been withdrawn, these portions of fastening material are severed and brought into alinement with the driver passages of the foot-plate 228 and the presser member 24, ready to be inserted upon the next reciprocation of the drivers 226.

In order that the tools 226 shall operate effectively both as awls and as drivers the downward extent of their path of movement is so controlled that when operating as awls they pass beyond the lower surface of the rib 25 a distance equal to the depth which they should penetrate into the work and which normally is substantially the combined thickness of the various layers of the overlasted marginal portion of the shoe upper and the insole. When the tools 226 are to serve as drivers, however, their downward movement should be arrested when their lower ends are substantially flush with the rib 25. The mechanism for effecting this operation of the tools 226 will now be described.

*The means for controlling the length of the stroke of the drivers*

For this purpose a rock shaft 270 (Figs. 2, 4, 5, 6 and 7), to which is secured an eccentric 272, is mounted in suitable bearings in the swinging head 220. The eccentric serves as the fulcrum for a bell crank lever 274 having a forwardly projecting arm the end of which is pivoted to the lower end of an upwardly extending link 276 the upper end of which is pivoted at 278 to the tool carrier or driver bar 224. Thus as the bell crank lever 274 is rocked the gang of drivers 226 will be reciprocated and the extent of their downward movement may be changed by changing the position of the eccentric 272 and hence changing the fulcrum point of the lever 274. Accordingly, the eccentric 272 is rocked back and forth in each cycle of operation through mechanism driven by the main cam shaft 214 and comprising a rock arm 280 (Fig. 2) fulcrumed on a rock shaft 281, which extends through the head 220 of the machine, for rocking movement independently thereof. The arm 280 carries a cam roll 282 located in a cam track 284 with which the cam member 252 is provided. Adjustably connected to the rock arm 280 by a bolt and slot connection 286 is one end of a link 288, the other end of which is pivoted at 290 to a rock arm 292 secured to the shaft 270. It will be understood, of course, that the form of the cam track 284 is such as to synchronize the rocking of the eccentric 272 with the reciprocation of the tool carrier 224 by the link 276 which also is driven from the main cam shaft 214 as will more fully hereinafter appear.

In order to facilitate adjustment of the distance which the tools 226 are projected below the lower surface of the rib 25 when they are acting as awls, the slot of the bolt and slot connection 286 is formed on an arc of a circle which is concentric with the pivot point 290 when the rock arm 280 is in the position which it occupies when the ends of the drivers 226 are flush with the lower surface of the rib 25. Thus this adjustment has no effect on the downward extent of the movement of the tools 226 when they are serving as drivers.

The mechanism for rocking the bell crank lever 274 comprises a cam member 300, best shown in Fig. 7, having two raised portions 301 and 302 terminating in shoulders 303 and 304, respectively, and rotated in the direction of the arrow in Fig. 7. The raised portions 301, 302 co-operate alternately with a hardened plate 306 secured to a block 307 pivoted at 308 to the depending arm of the bell crank lever 274. The plate 306 is urged toward the cam 302 by a stiff compression spring 310 so that when either of the raised portions of the cam 300 engages the plate 306 the bell crank lever 274 is rocked to elevate the driver bar 224 and the drivers 226 and when the corresponding shoulders 303, 304 pass out from under the plate 306 the spring 310 forces the driver bar 224 and the drivers 226 downwardly so that the latter form fastening receiving holes in the work piece or drive fastenings into previously formed holes, as the case may be.

The spring 310 surrounds a rod 312 to the upper or right-hand end of which, as viewed in Fig. 7, is secured an abutment 314 for the spring 310. The other end of the spring 310 bears against an abutment 316 provided with an internally threaded hub 318 adjustably mounted on an externally threaded hub 320 projecting from a circular support 322 mounted for rotary adjustment in a bearing member 324 secured to the head 220. It will be seen that by rotation of the member 322 the abutment 316 may be moved toward or from the abutment 314. It may be locked in adjusted position by a set screw 326 threaded into the abutment 316 and engaging the externally threaded hub 320.

The lower or left-hand end of the rod 312 is secured to a block 330 which is connected to the block 307 by four rods 332 which straddle the shaft 214 and the cam 300 and form with the blocks 330 and 307 a framelike structure connecting the bell crank lever 274 with the rod 312 and serve as tension members through which the compression of the spring 310 is effective to rock the bell crank lever 274 when one of the shoulders 303, 304 passes out from beneath the plate 306.

*The fastening material feeding means*

In order to complete the description of the fastening inserting mechanism of the machine there now remains only to describe the mechanism for feeding the strips 236 of fibre fastening material to the tubes 240 by which they are guided to the foot-plate 228. In connection with this portion of the machine reference should be had to Figs. 5, 13, 14 and 15.

The shaft 270 extends through the head 220 and is provided at its left-hand end with a split collar 271 (Figs. 5 and 6) having an undercut or dovetailed groove in which is adjustably clamped a correspondingly shaped member 340 to the upper end of which a link 342 is pivoted at 344. The other end of the link 342 is pivoted at 346 to the upper end of a lever 348 fulcrumed on a shaft 350 which extends outwardly from the head 220. Pivoted to the lower end of the lever 348 are two pawls 352, 353 (Fig. 13) urged in a counterclockwise direction, as viewed in Fig. 13 by springs 354, 355 into engagement with a ratchet 356, the relation of the pawls being such that when one of them is in operative relation to one of the teeth of the ratchet 356 the other one will be located in a position intermediate between two of the teeth so that the control of the ratchet 356 through the pawls 352, 353 is as delicate as that which would be provided by a single pawl operating against the ratchet teeth only half as large as those actually provided.

Secured to the ratchet 356 for rotation thereby about the shaft 350 is a metal cylinder 358 provided with a series of approximately semi-circular grooves 360, the bottom surfaces of which are knurled or roughened more effectively to engage the strips of fibre fastening material which pass through the respective grooves. Co-operating with the cylinder 358 is a roll 362 of rubber or other suitable material mounted on a shaft 364 carried by an adjustable bracket 366 pivoted at 368 to a pair of brackets 370 carried by the head 220. In order to provide for relative adjustment of the cylinder 360 and the roll 362 the bracket 366 is provided with a slot 372 through which passes the shank of a screw 374 which is pivoted at 376 to a stationary bracket 378 carried by the head 220. A wing nut 380 threaded on the screw 374 engages the upper surface of the bracket 366 and may be utilized to vary the force with which the somewhat yielding roll 362 is pressed into engagement with the strips of fibre fastening material 236 which occupy the grooves 360. The strips of fibre fastening material 236 are guided to and from the rolls 358, 362 by passages formed in a pair of blocks 382, 384 the latter of which serves also as a support for the upper ends of the tubes 240.

Figure 13:
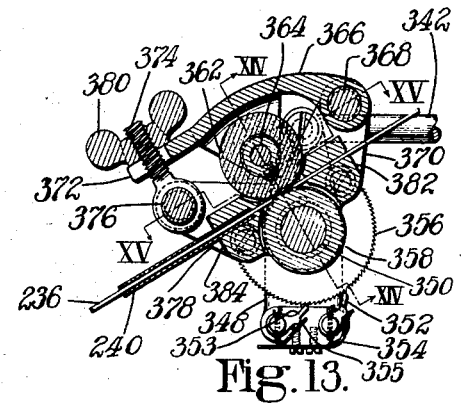
Fig. 13 is a transverse section through mechanism with which the machine is provided for feeding a series of strips of fibre fastening material to the fastening severing and inserting mechanism of the machine, taken on the line XIII—XIII of Fig. 6.
Figure 9:
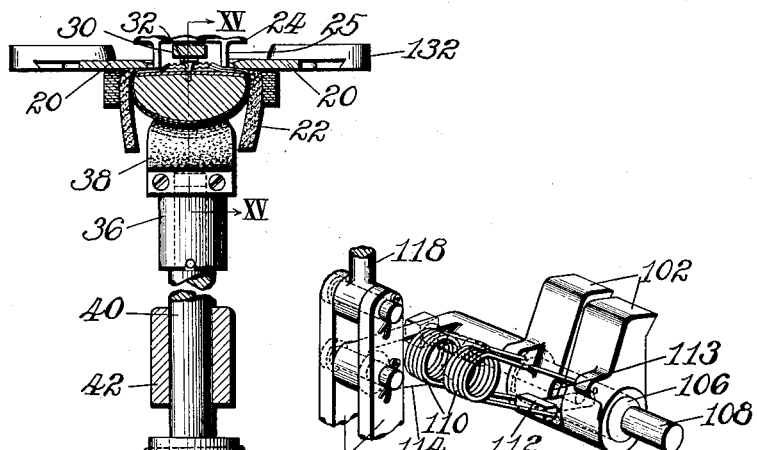
Fig. 9 is a detail perspective view of a pawl and pawl operating mechanism shown also in Fig. 8.

Thus it will be seen that whenever the shaft 270 is rocked in a counterclockwise direction as viewed in Fig. 13, or in a clockwise direction as viewed in Fig. 5, and this takes place early in each cycle of operation of the machine at a time when the driver passages 234 or the loader-block 230 are in alinement with the fastening material receiving passages of the foot-plate 228, suitable lengths of fastening material will be fed downwardly into the driver passages 234 of the loader-block. The length of the fastenings fed can, of course, be varied by adjusting the position of the member 340 in the groove of the collar 271. In addition to this adjustment, the length of the pegs severed is varied by the variation in the rocking movement of the shaft 270 which is caused by adjusting the rear end of the link 288 relatively to the rock arm 280 to vary the length of the awl stroke of the drivers 226 so that the length of the fastenings severed will be at all times suitable for the depths of the holes formed in the work piece.

The controlling mechanism

It will be remembered that while the machine is idle and while the wiper mechanism is being operated to work the shoe upper into lasted relation to the last and insole, the head 220 is maintained in a position remote from the work, as illustrated in Fig. 4. To hold the head 220 in this position, it is provided with a latch 400 (best shown in Figs. 4 and 5) pivoted to the head at 402 and provided with a hook-shaped end 404 arranged to engage a pin 406 projecting from the plate 212. The other end of the latch comprises a tail 408 provided with a hole 410 through which passes a rod 412 pivoted at 414 to one end of a lever 416 itself fulcrumed at 418 to an arm 419 secured to and extending a short distance from the rock shaft 281. The lever 416 is pivoted also to one end of a link 420 the other end of which is pivoted at 422 to a rock arm 424 secured to a rock shaft 426 to which is also secured a hand lever 428 urged in a counterclockwise direction, as viewed in Fig. 5, by a torsion spring 429. The hand lever 428 serves as a controller for the latch 400 and for various other parts of the machine.

A spring 430 surrounds the rod 412, engaging at one end against a washer 432 and at the other end against the tail 408 of the latch member 400. Movement of the latch member 400 beyond the desired position under the action of the spring 430 is prevented by a nut and lock nut 434 adjustably threaded on the end of the rod 412. By means of this construction the operator, by pulling forward (to the right as shown in Fig. 4) on the hand lever 428, rocks the lever 416 in a counterclockwise direction, as viewed in Fig. 4, thus rocking the latch 400 in a clockwise direction and releasing the hook 404 of the latch from the pin 406. The head 220 of the machine is approximately balanced upon the shaft 214, with a slight excess of weight to the rear of the shaft, so that after the operator has pulled the hand lever 228 toward him a short distance to release the latch 400 he can, with the exercise of only a small force, swing the head 220 forwardly about the shaft 214 until the rib 25 of the presser member 24 rests upon the overlasted marginal portion of the shoe upper inside of but adjacent to the edges of the wipers 20, as shown in Fig. 5. Further movement of the hand lever 428 after the head 220 reaches this position is effective to trip the clutch by means of which power is transmitted to the shaft 214.

In addition to serving as a portion of the releasing mechanism for the latch 400, the lever 416 serves also as a portion of means for locking the head 220 in fastening position and as a portion of a safety mechanism by which tripping of the clutch which connects the gear 218 with the shaft 214 is prevented until the head 220 has been swung downwardly and has reached fastening inserting position.

The clutch

Figures 10, 11, 12:
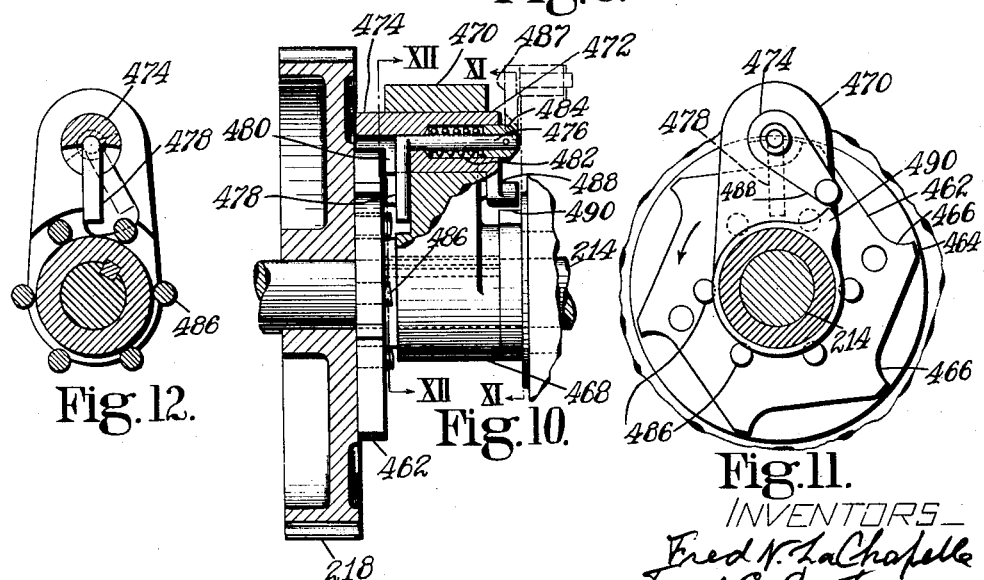
Fig. 10 is a sectional view through the clutch mechanism of the machine.
Figs. 11 and 12 are sectional views on the lines XI—XI, XII—XII, respectively, of Fig. 10.

The clutch, illustrated particularly in Figs. 10, 11 and 12, is provided with a driving member 462 secured to the continuously driven gear 218 and provided with a series of teeth 464 the leading surface of each of which is arcuate, as shown at 466 in Fig. 11. The driven member of the clutch comprises a collar 468 fast upon the shaft 214 and having a projecting arm 470 bored to receive a key member 472 having an approximately semi-cylindrical projecting end 474 which may be rotated into the path of movement of one of the teeth 464. The key 472 is provided with a longitudinal bore in which is positioned a longitudinal yielding plunger 476 having a radially extending arm 478 which is mounted for sliding movement in a slot 480 formed in the key member 472. A spring 482 surrounds the plunger 476, bearing upon a collar 484 pinned to the plunger 476 and urging it to the right, as viewed in Fig. 10. When the plunger 476 is urged to the left, which is done by a controlling member or tappet 486 carried by the lever 416, the radial arm 478 moves into the path of a series of short pins 86 carried by the driver member 462 and is rotated by one of these pins about the axis of the plunger 476 and the key 472 (in a clockwise direction, as viewed in Fig. 11) thus rotating the end portion 474 of the key 472 into the path of movement of the next following tooth 464 and thereby rotating the driven member 468 on the shaft 214. Toward the end of the revolution, however, the end of an arm 488 depending from the rear end of the key 472 engages a stationary cam 490 secured to the frame of the machine and is rotated in a counterclockwise direction to the position shown in Fig. 11 thus rocking the end 474 of the key 472 out of the path of movement of the teeth 464 thereby putting the clutch in non-power transmitting condition. This takes place shortly before the end of the revolution and the machine drifts to rest.

This novel clutch mechanism is not claimed herein since it is the sole invention of Fred C. Eastman and is claimed in a copending application for Letters Patent of the United States Serial No. 430,049, filed February 20, 1930, in his name to which reference may be had for a fuller disclosure.

The plunger 476 is thrust forward to the left, as viewed in Fig. 10, to trip the clutch by a tappet 487 which is brought into clutch tripping position by downward displacement of the hand lever 428 after the head 220 of the machine has reached fastening inserting position. Tripping of the clutch before the head 220 reaches this position is prevented by a cam surface 500 (Fig. 5) formed on the plate 212 and serving as a guard to prevent counterclockwise movement of the lever 416 (as viewed in Figs. 4 and 5) to an extent sufficient to trip the clutch until after the head has reached fastening inserting position. By the time that the head 220 reaches fastening inserting position, however, the end 502 of the lever 416 has reached a shoulder 504 formed in the cam surface 500 (see Fig. 5) so that the lever 416 can be moved somewhat further in a counterclockwise direction about its pivot 418, thereby thrusting the wedged-shaped end 506 of the tappet 487 against an inclined surface formed on the projecting end of the collar 484. This thrusts the plunger 476 forward to trip the clutch. To prevent the clutch repeating the tappet 487 is pivoted at 508 and is held yieldingly in appropriate relation to the levers 416, as shown in Fig. 5, by a light spring 510. When, however, toward the end of the revolution of the clutch, the collar 484 of the plunger 476 strikes the tappet 487, it strikes the edge and not the inclined edge surface of the tappet and therefore moves the tappet somewhat in a clockwise direction, as viewed in Fig. 5, against the force of the spring 510 and is not itself displaced to or toward clutch tripping position.

*The means for forcing the fastening inserting mechanism against the work piece and locking it in that position before the fastenings are inserted*

It is desirable to force the rib 25 of the presser plate 24 firmly against the shoe before the fastenings are inserted and the illustrated machine is arranged to operate in that fashion. For this reason the cam member 252 is provided with a cam surface 519 having a depressed portion 520 (Fig. 2) which, when the machine comes to rest, is positioned beneath a cam roll 522 carried by a lever 524 fulcrumed loose on the shaft 281 and provided with a seat 526 which is engaged by the end of a screw 528 adjustably threaded into an arm 530 secured to the rock shaft 281. A torsion spring 532 (Fig. 6) surrounds the rock shaft 281 and is anchored at one end to a collar 534 secured to the shaft and at the other end to the frame of the swinging head 220, tending to rotate the shaft 281 in a counterclockwise direction, as viewed in Fig. 2, and thus through the arm 530 and the screw 528 urging the roll 522 into engagement with the cam 519. As viewed in Fig. 2, the roll 522 engages the raised portion of the cam 519 and this condition is produced soon after the tripping of the clutch and before the operation of the fastening inserting means, as soon indeed as the cam member 252 rotates sufficiently to cause the depressed portions 520 of the cam surface 519 to pass out from under the roll 519. At the time that this takes place the lever 524 is rocked slightly upwardly (in a clockwise direction as viewed in Fig. 2 or in a counterclockwise direction as viewed in Fig. 5) rocking the arm 419 in the same direction. This tends to force the fulcrum of the lever 416 substantially downwardly (see Fig. 5) but such movement is resisted and prevented by the bearing of the lower end 502 of the lever against the shoulder 504 of the cam surface 500. The force thus applied is thereafter effective to rock the swinging head 220 slightly in a clockwise direction, as viewed in Fig. 5, since there is no other way in which it can be expended, and this is effective to press the rib 25 of the presser plate 24 firmly against the work. The raised portion of the cam 519 is effective to hold the head 220 locked in this position until the cycle of operation has been substantially completed when the roll 522 passes into the recess 520 of the cam surface 519 thus rocking the lever 419 slightly in a clockwise direction, as viewed in Fig. 5, and relieving the pressure.

It may be helpful to an understanding of the pressure applying movement of the head 220 to consider the quadrilateral formed by four straight lines joining (a) the point of contact of the lower end 502 of the lever 416 with the shoulder 504 of the cam surface 500, (b) the fulcrum point of the lever 416 on the lever 419, (c) the axis of the shaft 281 and (d) the axis of the shaft 214. It will be observed that points (a) and (d) and the line connecting them are fixed and that when the line connecting points (b) and (c) (which line corresponds to the effective length of the lever arm 419) is rotated in a counterclockwise direction about point (b) the point (c) must also move in an arc having the point (d) as a center. This it can do since the point (b) can also move in an arcuate path about the point (a) as a center. It is, of course, the locking movement of the frame 220 which is itself effected about the point (d) (the center of shaft 214) which is effective to press the rib 25 against the overlasted portion of the shoe upper.

After the clutch has been tripped the operator releases the handle 428 which, however, is maintained in depressed position until the depressed portion 520 of the cam surface 519 reaches the cam roll 522. When this takes place the lever arm 419 is rocked in a clockwise direction, as viewed in Fig. 5, to relieve the pressure of the rib 25 upon the shoe. The clutch is thrown out at substantially the same time and the machine comes to rest. Upon the release of the pressure, the lever 416 is rocked slightly in a clockwise direction, as viewed in Fig. 5, by the torsion spring 429 thus returning the lever 428 to its normal inoperative position relatively to the swinging head 220 and at the same time causing the lower end 502 of the lever 416 to clear the shoulder 504 of the cam surface 500 so that the head 220 is free to swing back to the position shown in Fig. 4 under the action of gravity. In order to prevent an undue shock when the head 220 reaches its inoperative position suitable bumper mechanism may be provided. As illustrated this comprises a rod 550 pivoted at 552 to the member 324, which it will be remembered is secured to the head 220, and passing through an eye 554 secured to the frame of the machine. A spring 556 surrounds the rod 550 above the eye 554, its upper end being positioned to engage a collar 558 secured to the rod 550 before the head 220 reaches its rearmost position. The compression of the spring 556 thus serves to cushion the shock and the head comes to rest. In order to cushion the shock when the operator swings the head into fastening inserting position, a spring 560 surrounds the shaft 550 below the eye 554, bearing at its upper end against the eye and at its lower end against a collar 562 clamped to the rod 550 below the eye 554.

*The operation of the machine*

In operating the machine the operator utilizes the pins 32 properly to position the shoe upper, insole and last, the work being supported by the toe rest 36. He then operates the lasting instrumentalities in the manner which is described in the early part of this specification to work the shoe upper into lasted relation to the insole and last, finally partially withdrawing the wipers 20 to the position shown in Fig. 17. While this is going on the swinging head 220 and the fastening inserting mechanism carried thereby are maintained in a position remote from the work, as shown in Fig. 4. When the operator is ready for the insertion of the fastenings he grasps the hand lever 428 and swings the head 220 forwardly and downwardly to the position shown in Figs. 2 and 4. The initial portion of the movement of the hand lever 428 is effective to release the latch 400 which until that time had held the head 220 against forward and downward movement. After the head 220 reaches the position shown in Figs. 4 and 5, with the approximately U-shaped rib 25 of the presser plate 24 in engagement with the overlasted portion of the shoe upper inside of but adjacent to the edge of the wipers 20, further depression of the hand lever 428 is effective to rock the lever 416 slightly in a counter-clockwise direction to the position shown in Fig. 5, which causes the tappet 487 to trip the clutch. The first effect of the tripping of the clutch is to press the rib 25 forcibly against the shoe upper by reason of the downward thrust imparted to the lever 416 when the cam roll 522 rides from the recess 520 on to the elevated portion of the cam 519. Thereafter, the bell crank lever 274 is rocked twice, first to cause the tools 227 to form fastening receiving openings in the work piece and thereafter to cause them to drive fastenings into the holes, the stroke of the tools 226 being controlled by the position of the eccentric 222, which it will be remembered, is rocked by the cam groove 284 and the intervening link and lever connections. Toward the end of the cycle of the operation, after the fastenings have been inserted, the roll 522 drops into the recess 520 of the cam 519, relieving the pressure of the rib 25 against the shoe and permitting the lever 416 to swing to its inoperative position under the influence of the spring 429 after which the head 220, now released, swings to its inoperative position shown in Fig. 4.

Having described our invention, what we claim as new and desire to secure by Letters Patent of the United States is:—

1. A lasting machine having means for working a shoe upper into lasted relation to a last and insole, fastening inserting mechanism constructed and arranged to insert fastenings through the overlasted marginal portion of the shoe upper into the insole to secure the upper in lasted relation to the insole and last, the entire fastening inserting mechanism being mounted for swinging movement as a unit toward and from the shoe operated on about an axis not substantially higher than the shoe so that the fastening inserting means can be maintained remote from the shoe while the upper is being worked into lasted relation to the last and insole and can be swung into operative relation to the shoe upper and insole after the upper has been worked into lasted relation for the insertion of the fastenings, and means for operating the fastening inserting mechanism after it has been swung into operative position.

2. A lasting machine having mechanism for working the end portion of a shoe upper into lasted relation to a last and insole, and a gang of fastening inserting instrumentalities arranged to insert a row of fibre-fastenings peripherally of an end portion of the shoe after its upper has been worked into lasted position, said gang of fastening inserting instrumentalities being mounted for swinging movement as a unit toward and from the shoe operated on so that the fastening inserting instrumentalities can be maintained in a position remote from the shoe while the upper is being worked into lasted relation to the last and insole and can be swung into operative relation to the shoe upper and insole after the upper has been worked into lasted relation for the insertion of said row of fibre-fastenings.

3. A lasting machine having a work support arranged to receive a last on which is assembled a shoe upper and an insole and to support the last sole upwardly, wipers for working an end portion of the shoe upper into lasted relation to the last and insole, a column, and a fastening inserting mechanism carried by the column and constructed and arranged to be swung about a horizontal axis from an idle position remote from the shoe to a position over and adjacent to the end of the shoe for the insertion of fastenings to hold the upper in lasted relation to the insole.

4. A lasting machine having mechanism for working the end portion of a shoe upper into lasted relation to a last and insole, and fastening inserting instrumentalities comprising a presser member provided with a plurality of driver passages, means for conducting fibre fastenings to the driver passages, and a gang of drivers reciprocable through the driver passages to insert the fibre fastenings through the lasted shoe upper into the insole to hold the upper in lasted relation to the insole, said fastening inserting instrumentalities being mounted for swinging movement as a unit toward and from the shoe which is to be operated upon so that the fastening inserting instrumentalties can be maintained remote from the shoe while the shoe upper is being worked into lasted position and can be swung into operative relation to the shoe after the upper has been worked into lasted position for the insertion of the fastenings.

5. A lasting machine having a support for a last on which are assembled an insole and a shoe upper, wipers constructed and arranged to work the toe portion of the shoe upper into lasted relation to the last and insole on the support, a gang of fastening inserting tools arranged to insert a row of fastenings through the shoe upper into the insole peripherally of the toe portion of the shoe after that portion of the upper has been wiped into lasted position, and means for reciprocating said tools, said gang of fastening inserting tools and the means for reciprocating them being mounted for swinging movement as a unit toward and from the shoe on the support so that the fastening inserting instrumentalities and their reciprocating means can be maintained at a position remote from the shoe on the support while the upper is being worked into lasted position and can be swung into operative position relatively to the shoe after the upper has been worked into lasted position for the insertion of the fastenings.

6. A fastening inserting machine having a support for a shoe which is to be operated upon, a frame, fibre-fastening inserting mechanism carried by the frame and constructed and arranged to insert one or more fibre-fastenings into the shoe to secure together parts thereof, said frame being pivotally mounted for swinging movement toward and from the support so that the entire fastening inserting mechanism can be maintained at an inoperative position remote from the support while the shoe is being placed thereon and can be swung into operative engagement with the shoe after the shoe has been placed upon the support for the insertion of one or more fibre-fastenings into the shoe, means for locking the frame in inoperative position, and means for releasing the locking means and moving the frame and fastening inserting mechanism to operative position.

7. A machine for use in the manufacture of shoes having a support constructed and arranged to hold the shoe to be operated upon, a gang of fastening inserting drivers arranged to insert a plurality of fastenings into the shoe to secure together parts thereof, means for supplying fibre-fastenings for insertion by the drivers, said gang of fastening inserting drivers and the fibre-fastening supplying means being mounted for swinging movement as a unit toward and from a shoe on the support so that they can be maintained at a position remote from the support while the shoe is being placed thereon and can be swung into operative position relatively to the shoe after it has been placed on the support, a latch constructed and arranged to lock the fastening inserting instrumentalities in inoperative position, and means arranged to release said latch to permit the gang of fastening inserting drivers and the fibre supplying means to be moved into operative position.

8. A machine for use in the manufacture of shoes having a work support constructed and arranged to hold a shoe to be operated upon, fastening inserting instrumentalities arranged to insert fastenings into the shoe to secure together parts thereof, means for severing fastenings from a source of supply and presenting them to the inserting instrumentalities, said fastening inserting instrumentalities being pivoted for swinging movement as a unit toward and from a shoe on the support about an axis substantially parallel to the longitudinal axis of the shoe on the support and not substantially higher than the shoe so that the fastening inserting instrumentalities can be maintained at a position remote from the support while the shoe is being placed thereon and can be swung into operative position relatively to the shoe after it has been placed on the support, means for locking the fastening inserting instrumentalities in inoperative position, and means for releasing the locking means to permit the fastening inserting instrumentalities to be moved to operative position.

9. A fastening inserting machine having a support for a shoe which is to be operated upon, a frame, fastening inserting mechanism carried by the frame and constructed and arranged to sever one or more fibre-fastenings from a strip of fibre-fastening material and to insert the fastening or fastenings into the shoe to secure together parts thereof, said frame being pivotally mounted for swinging movement toward and from the support so that the fastening inserting means can be maintained at a position remote from the support while the shoe is being placed thereon and can be swung into operative relation to the shoe after the shoe has been placed upon the support for the insertion of one or more fastenings into the shoe, and means constructed and arranged to lock the frame and fastening inserting mechanism in operative position.

10. A lasting machine having a support for a last on which are assembled an insole and a shoe upper, wipers for working an end portion of the shoe upper into lasted relation to the last and insole, fastening inserting mechanism arranged to be brought into operative relation to the shoe and comprising a presser member having a rigid portion shaped to conform to the outline of the wipers and constructed and arranged to be brought into engagement with the shoe upper inside of but adjacent to the edge of the wipers and provided with a plurality of driver passages, a loader-plate, means for operating the loader-plate to present fastenings in the driver passages in front of the drivers, a foot-plate adjacent to the loader-plate through which fastenings are conducted to the loader-plate, said foot-plate having a series of driver passages in alinement with the driver passages in the presser member, a gang of drivers reciprocable through the driver passages in the foot-plate, the loader-plate and the presser member, and means for reciprocating the drivers to drive the fastenings through the shoe upper into the insole thereby maintaining the upper in lasted relation to the insole.

11. A lasting machine having a support for a last on which are assembled an insole and a shoe upper, wiper mechanism arranged to work the shoe upper into lasted relation to the insole and last and provided with wipers conforming in outline substantially to the outline of the end portion of a shoe, fastening inserting mechanism arranged to be brought into engagement with the upper of the shoe adjacent to the wipers after the shoe upper has been worked into lasted relation and comprising a member having a rib shaped to conform substantially to the outline of the wipers whereby it can be brought into engagement with the shoe upper closely adjacent to the edge of the wipers, said rib being provided with a plurality of driver passages, a gang of drivers reciprocable through the driver passages, means for presenting fibre pegs in the driver passages in front of each driver, and means for reciprocating the drivers to drive the pegs through the shoe upper into the insole thereby maintaining the upper in lasted relation to the insole.

12. A lasting machine having a support for a last on which are assembled an insole and a shoe upper, wipers for working the end portion of the shoe upper into lasted relation to the insole and last and conforming in outline substantially to the outline of the end portion of the shoe, fastening inserting mechanism arranged to be brought into engagement with the upper of the shoe after the shoe upper has been worked into lasted relation and comprising a presser member having a portion shaped to conform substantially to the outline of the wipers and arranged to be brought into engagement with the shoe upper inside the edge of the wipers, said presser member being provided with a plurality of driver passages, a foot-plate having a series of driver passages and a series of passages receiving the ends of a corresponding number of strips of fastening material, a loader-plate located between the presser member and the foot-plate and arranged to receive the ends of strips of fastening material projecting through the passages of the foot-plate, means for moving the loader-plate to shear fastenings from the ends of the strips of fastening material and to present the fastenings in line with the driver passages of the foot-plate and the presser member, and means for reciprocating the drivers to drive the fastenings through the shoe upper into the insole thereby to maintain the upper in lasted relation to the insole.

13. A lasting machine having a work support arranged to receive a last on which is assembled a shoe upper and an insole and to support the last sole upwardly, means for working the shoe upper into lasted relation to the last and insole, fastening inserting mechanism pivoted to be swung from a position clear of the shoe on the support to a position adjacent to the shoe for the insertion fo fastenings to hold the upper in lasted relation to the insole of the shoe, said fastening inserting mechanism comprising a presser member having a rigid rib constructed and arranged to engage the overlasted portion of the shoe upper and having a plurality of driver passages and drivers reciprocable through said driver passages to insert fastenings through the shoe upper into the insole.

14. A fastening inserting machine having a presser-plate provided with a series of substantially parallel driver passages, a foot-plate spaced from the presser-plate and provided with driver passages in alinement with those of the presser-plate and with a series of passages for the reception of the ends of a series of strips of fibre-fastening material, a loader-block having a series of driver passages arranged to be positioned in alinement with the fastening material receiving passages of the foot-plate and by movement transversely of said passages to sever pegs from the material and to transfer the severed pegs into alinement with the driver passages of the foot-plate and presser-plate, and a gang of drivers reciprocable through the driver passages to drive the pegs through the driver passages into a shoe presented to the presser-plate.

15. A lasting machine having a support for a last on which are assembled an insole and a shoe upper, mechanism for working the shoe upper into lasted relation to the last and the insole, a head, a gang of fastening inserting tools carried by the head and arranged to insert fastenings peripherally of a portion of the insole and shoe upper to secure the upper in lasted relation to the insole, and means carried by said head for operating the fastening inserting tools, said head being mounted for movement toward and from the shoe on the support so that the fastening inserting instrumentalities can be maintained at a position remote from the shoe while the upper is being worked into lasted relation and can be thereafter brought into operative relation to the shoe upper for the insertion of the fastenings, said fastening inserting instrumentalities comprising a plurality of drivers and a presser member arranged directly to engage the shoe upper and provided with a plurality of substantially parallel driver passages through which the drivers are reciprocated to insert fastenings through the shoe upper into the insole.

16. A lasting machine having a support for a last on which are assembled an insole and a shoe upper, wipers constructed and arranged to work the toe portion of the shoe upper into lasted relation to the last and insole, a head, a gang of fastening inserting tools carried by the head and arranged to form a row of fastening receiving holes peripherally of the toe portion of the insole and shoe upper and thereafter to insert a row of fastenings in the holes to secure the upper in lasted relation to the insole, said head being pivoted for swinging movement toward and from the shoe on the support so that the fastening inserting tools can be maintained at a position remote from the shoe while the upper is being worked into lasted relation and can be thereafter brought into operative relation to the shoe upper for the insertion of the fastenings, said fastening inserting tools comprising a plurality of drivers and a presser member arranged to engage the shoe upper inside the edge of the wipers and provided with a plurality of substantially parallel driver passages through which the drivers are reciprocated to insert fastenings through the shoe upper into the insole.

17. A lasting machine having a work support arranged to receive a last on which is assembled a shoe upper and an insole and to support the last sole upwardly, wipers for working the end portion of the shoe upper into lasted relation to the last and insole, and fastening inserting mechanism constructed and arranged to be moved from a position clear of the shoe on the support to a position adjacent to the end of the shoe for the insertion of a row of fastenings to hold the upper in lasted relation to the insole of the shoe, said fastening inserting mechanism comprising a presser member having a rigid rib constructed and arranged to engage the shoe upper inside of but adjacent to the edge of the wipers and having a plurality of substantially parallel driver passages and a gang of drivers reciprocable through said driver passages to insert fastenings through the shoe upper into the insole.

18. A fastening inserting machine having a presser-plate provided with an approximately U-shaped rib having a row of driver passages extending heightwise of the rib, a foot-plate spaced from the presser-plate and provided with driver passages in alinement with those of the presser-plate and with a row of passages for the reception of the ends of a series of strips of fibre-fastening material, a loader-block having a series of driver passages arranged to be positioned in alinement with the fastening material receiving passages of the foot-plate and by movement transversely of said passages to sever pegs from the material and to transfer the severed pegs into alinement with the driver passages of the foot-plate and presser-plate, and a gang of drivers reciprocable through the driver passages to drive the pegs through the driver passages into a shoe presented to the presser-plate.

19. A fastening inserting machine having a support for a shoe to be operated upon, and gang fastening inserting mechanism pivoted to be maintained in a position remote from the work support while the shoe is placed thereon and thereafter to be swung into operative relation to the shoe on the support for the insertion of fastenings into the shoe to secure together parts thereof, said fastening inserting mechanism comprising a foot-plate having a series of driver passages, a loader-block having two sets of driver passages arranged to conform to the driver passages and so located that either set may be brought into alinement with the driver passages in the foot plate, a presser member provided with driver passages in alinement with the driver passages of the foot-plate and forming with the foot-plate a slideway in which the loader-block is received, means for supplying fastenings to one set of passages in the loader-block while the other set is in alinement with the driver passages of the foot-plate and the presser member, means for operating the loader-block to move the fastenings into alinement with the driver passages of the foot-plate and the presser member to supply fastenings for insertion by the drivers, and means for operating the drivers to drive the fastenings into the shoe.

20. A fastening inserting machine having a support for a shoe to be operated upon, and gang fastening inserting mechanism constructed and arranged to be maintained in a position remote from the work support while a shoe is placed on the work support and thereafter to be moved into operative relation to the shoe on the support for the insertion of fastenings into the shoe to secure together parts thereof, said fastening inserting instrumentalities comprising a foot-plate having a series of driver passages and a series of passages to receive strips of fibre fastening material, a loader-block having two sets of driver passages arranged to conform to the two sets of passages of the foot-plate so located with respect to each other that when one set of driver passages of the loader-block is in alinement with the driver passages in the foot-plate the other set of passages of the loader-block is in alinement with the fastening material receiving passages in the foot-plate, a presser member provided with driver passages in alinement with the driver passages of the foot-plate and forming with the foot-plate a slideway in which the loader-block is received, means for operating the loader-block to present fastenings for insertion by the drivers, and means for operating the drivers to drive the fastenings into the shoe.

21. A fastening inserting machine having a support for a shoe to be operated upon, and gang fastening inserting mechanism constructed and arranged to be moved to a position remote from the work support while the shoe is placed thereon and thereafter to be moved into operative relation to a shoe on the support for the insertion of fastenings into the shoe to secure together parts thereof, said fastening inserting mechanism comprising a foot-plate having a series of driver passages and a series of passages to receive strips of fibre-fastening material, a loader-block having two series of driver passages arranged to conform to the driver passages and the fastening material passages of the foot-plate so located with respect to each other that when one set of driver passages of the loader-block is in alinement with the driver passages in the foot-plate the other set is in alinement with the fastening material receiving passages in the foot-plate, a presser member provided with driver passages in alinement with the driver passages of the foot-plate and forming with the foot-plate a slideway in which the loader-block is received, means for operating the loader-block to sever fastenings from the fibre-fastening material and to transfer the fastening to the driver passages, and means for operating the drivers to insert the fastenings into the shoe operable only after the head has been moved into operative relation to the shoe on the support.

22. A lasting machine having a support for a last on which are assembled an insole and a shoe upper, wipers for working the end portion of the shoe upper into lasted relation to the insole and last and conforming in outline substantially to the outline of the end portion of the shoe, fastening inserting mechanism arranged to be brought into engagement with the upper of the shoe after the shoe upper has been worked into lasted relation and comprising a presser member having a rib shaped to conform substantially to the outline of the wipers and arranged to be brought into engagement with the shoe upper inside but closely adjacent to the edge of the wipers, said rib being provided with a plurality of substantially parallel driver passages, a foot-plate having a series of driver passages and a series of openings receiving the ends of a corresponding number of strips of fastening material, a loader-block located between the presser plate and the foot-plate and arranged to receive the ends of the strips of fastening material located in the openings of the foot-plate, means for moving the loader-block to shear fastenings from the end of the strip of fastening material and to present the fastenings in line with the driver passages of the foot-plate and presser member, and means for reciprocating the drivers first to form fastening-receiving holes in the shoe upper and insole and then to drive the fastenings through the shoe upper into the insole thereby to maintain the upper in lasted relation to the insole.

23. A fastening inserting machine having a presser-plate provided with a plurality of driver passages arranged in a row and extending heightwise of the rib, a foot-plate spaced from the presser-plate and provided with a series of driver passages alining with the driver passage of said presser-plate and having also a second series of passages conforming in arrangement with but out of alinement with the driver passages in said presser-plate, a gang of drivers reciprocable through said driver passages, a loader-block located between the foot-plate and the presser-plate and provided with a series of fastening receiving passages arranged to conform with the arrangement of the driver passages in the rib and the foot-plate, means for moving said loader-block to bring its openings out of alinement with the driver passages and into alinement with the second series of passages in the foot-plate to receive the end portions of a series of strips of fibre peg material thereafter projected through the second series of passages in the foot-plate into the passages in the loader-block and for moving it from that position to bring its openings into alinement with the driver passages, thereby severing a series of fibre pegs from the peg material and bringing the pegs into alinement with the drivers, and means for reciprocating the drivers to drive the pegs through the driver passages into a shoe presented to the rib of the presser-plate.

24. A lasting machine having a support for a last on which are assembled an insole and a shoe upper, means for working an end portion of the shoe upper into lasted relation to the insole and last, fastening inserting mechanism arranged to be brought into engagement with the shoe upper after the shoe upper has been worked into lasted relation and comprising a member having a rib shaped to conform approximately to the outline of the end portion of a shoe and provided with a plurality of driver passages, a gang of drivers reciprocable through the driver passages, means for presenting fastenings in the driver passages in front of the drivers, and means for reciprocating the drivers to drive the fastenings through the shoe upper into the insole thereby maintaining the upper in lasted relation to the insole.

25. A fastening inserting machine having a presser-plate provided with an approximately U-shaped rib having a row of driver passages extending heightwise of the rib, a gang of drivers reciprocable through said driver passages, means for severing a plurality of fibre pegs from fibre-peg material and presenting one of the pegs to each driver passage, and means for reciprocating the drivers to drive the pegs through the driver passages into a shoe presented to the presser-plate.

26. A machine for operating upon shoes, having, in combination, wipers constructed and arranged to work a shoe upper into lasted relation to a last and insole, a presser-plate provided with an approximately U-shaped rib arranged to engage the overlasted portion of the upper adjacent to the edges of the wipers and having a row of driver passages extending heightwise of the rib, and a gang of drivers reciprocable through said passages to drive a series of fastenings into a shoe presented to the presser-plate.

27. A lasting machine having wipers for working an end portion of a shoe upper into lasted relation to a last and insole, and fastening inserting mechanism having a presser-plate provided with an approximately U-shaped rib conforming to the edges of the wipers while the wipers are holding the upper in overlasted position and arranged to engage the shoe upper inside of but adjacent to the edges of the wipers, said presser plate having a series of driver passages extending through the rib heightwise thereof, and a gang of drivers reciprocable through said driver passages to insert a series of fastenings into the shoe to hold the shoe upper in lasted relation to the insole and last.

28. A machine for operating upon shoes having, in combination, wipers for working a shoe upper into lasted relation to a last and insole, and a presser member having an approximately U-shaped rib conforming to the edges of wipers and arranged to engage the shoe upper inside of but adjacent to the edges of the wipers, said presser plate having a row of driver passages extending heightwise of the rib.

29. A lasting machine having a support for a last on which are assembled an insole and a shoe upper, wipers for working an end portion of the shoe upper into lasted relation to the last and insole, a frame, fastening inserting means carried by the frame and constructed and arranged to drive one or more fibre-fastenings through an end portion of the shoe upper into the insole to secure the shoe upper in lasted relation to the insole, said frame being pivotally mounted for swinging movement toward and from the shoe on the support so that the fastening inserting instrumentalities can be maintained at a position remote from the support while the shoe is being placed on the support and the end portion of the upper wiped into lasted relation to the last and insole, a latch constructed and arranged to hold the frame in inoperative position, and means for releasing the latch thereby permitting the frame to be swung into operative relation to the shoe on the support after the upper has been worked into lasted position for the insertion of a fastening or fastenings therein.

30. A machine for use in the manufacture of shoes having a work support constructed and arranged to hold the shoe to be operated upon and a gang of fastening inserting instrumentalities arranged to insert a plurality of fastenings into the shoe to secure together parts thereof, said gang of fastening inserting instrumentalities being mounted for swinging movement as a unit toward and from a shoe on the support so that the fastening inserting instrumentalities can be maintained at a position remote from the support while the shoe is being placed thereon and can be swung into operative position relatively to the shoe after it has been placed on the support, a latch constructed and arranged to hold the fastening inserting instrumentalities in inoperative position, a manually operable controller, and connections from the controller to the fastening inserting instrumentalities and to the latch such that by displacement of the controller the latch will be released and the fastening inserting instrumentalities thereafter moved to operative position.

31. A lasting machine having a work support arranged to receive a last on which is assembled an insole and a shoe upper, means for working an end portion of the shoe upper into lasted relation to the last and insole, a head mounted for swinging movement to and from operative position, fastening inserting mechanism carried by the head, a clutch arranged when tripped to transmit power to the fastening inserting mechanism, a controller, and connections from the controller to the clutch constructed and arranged to cause the clutch to be tripped by movement of the controller after the head is in operative position thereby operating the fastening inserting mechanism to insert a row of fastenings through the shoe upper into the insole.

32. A fastening inserting machine having a work support arranged to receive a shoe in which fastenings are to be inserted, a head mounted for swinging movement to and from operative relation to the shoe on the support, fastening inserting mechanism carried by the head, a latch operative to hold the head in inoperative position, a clutch arranged when tripped to transmit power to the fastening inserting mechanism, a controller, and connections from the controller to the latch and to the clutch such that displacement of the controller is effective to release the latch whereby the head may be swung to operative position and thereafter to trip the clutch thereby causing the operation of the fastening inserting mechanism.

33. A fastening inserting machine having a work support arranged to receive a shoe in which fastenings are to be inserted, a head provided with fastening inserting mechanism and mounted for swinging movement to an inoperative position remote from the work support and to an operative position in which the fastening inserting mechanism is in engagement with a shoe carried by the work support, a handle by which the head may be swung from inoperative to operative position, a latch carried by the head, and connections between the latch and the handle such that displacement of the handle is effective first to release the latch and thereafter to swing the head.

34. A fastening inserting machine having a work support arranged to receive a last on which an insole and shoe upper are mounted, means for working the shoe upper into lasted relation to the insole and last, a head mounted for swinging movement to and from operative relation to the shoe on the support, fastening inserting mechanism carried by the head, a latch operative to hold the head in inoperative position, a clutch arranged when tripped to transmit power to the fastening inserting mechanism, a controller, and connections from the controller to the latch and to the clutch such that displacement of the controller is effective to release the latch whereby the head may be swung to operative position and thereafter to trip the clutch thereby causing the fastening inserting mechanism to insert fastenings through the shoe upper into the insole to hold the upper in lasted relation to the insole and last.

35. A fastening inserting machine having a work support arranged to receive a last on which an insole and a shoe upper are mounted, a pair of wipers constructed and arranged to work an end portion of the shoe upper into lasted relation to the insole and last, a head provided with fastening inserting mechanism for inserting fastenings to secure the upper in lasted relation to the insole and last and mounted for swinging movement to an inoperative position remote from the work support and to an operative position in which the fastening inserting mechanism is in engagement with a shoe carried by the work support, a handle by which the head may be swung from inoperative to operative position, a latch carried by the head, and connections between the latch and the handle such that displacement of the handle is effective first to release the latch and after which the handle may be used to swing the head to fastening inserting position.

36. A machine for use in the manufacture of shoes having a work support constructed and arranged to hold a shoe to be operated upon, and a gang of fastening inserting instrumentalities arranged to insert a plurality of fastenings into the shoe to secure together parts thereof, said gang of fastening inserting instrumentalities being mounted for swinging movement as a unit toward and from the shoe on the support so that the fastening inserting instrumentalities can be maintained at a position remote from the support while the shoe is being placed thereon and can be swung into operative position relatively to the shoe after it has been placed on the support, a latch constructed and arranged to hold the fastening inserting instrumentalities in inoperative position, a manually operable controller, a clutch arranged when tripped to operate the fastening inserting instrumentalities, and connections from the controller to the latch and to the clutch such that by displacement of the controller the latch will be released, the fastening inserting instrumentalities moved to operative position and the clutch thereafter tripped to operate the fastening inserting instrumentalities.

37. A fastening inserting machine having a work support, a head, a gang of fastening inserting instrumentalities carried by the head and arranged to insert fastenings in the work piece on the support, said head being pivotally mounted for swinging movement toward and from the work support, a clutch for transmitting power to the fastening inserting instrumentalities, a latch constructed and arranged to hold the head in inoperative position, a hand lever carried by the head by which the head may be swung from inoperative to operative position, and connections from the hand lever to the latch and to the clutch through which displacement of the hand lever first releases the latch thereby permitting the head to be swung by the hand lever into operative position and after the head has reached operative position trips the clutch thereby operating the fastening inserting instrumentalities.

38. A lasting machine having a support for a last on which are assembled an insole and a shoe upper, wiper mechanism for working the end portion of the upper into lasted relation to an end portion of the last and insole, a head, a gang of fastening inserting instrumentalities carried by the head and arranged to insert a row of fastenings peripherally of the end portion of the shoe to secure the shoe upper in lasted relation to the insole, said head being pivotally mounted for swinging movement toward and from the plane of the insole of a shoe on the support, a clutch for transmitting power to the fastening inserting instrumentalities, a latch constructed and arranged to hold the head in inoperative position, a hand lever carried by the head by which the head may be swung from inoperative to operative position, and connections from the hand lever to the latch and to the clutch through which displacement of the hand lever first releases the latch thereby permitting the head to be swung by the hand lever into operative position and after the head has reached operative position trips the clutch thereby operating the fastening inserting instrumentalities.

39. A lasting machine having a work support arranged to receive a last on which is assembled a shoe upper and an insole, wipers constructed and arranged to work an end portion of the shoe upper into lasted relation to the last and insole, gang fastening inserting mechanism constructed and arranged to be swung from an inoperative position clear of the shoe to a position adjacent to the end of the shoe for the insertion of a row of fastenings to hold the upper in lasted relation to the insole, a latch operative to hold the fastening inserting mechanism in inoperative position and releasable to permit the fastening inserting mechanism to be swung into operative position, means for forcing the fastening inserting mechanism against the shoe, and means for thereafter operating the fastening inserting mechanism to insert fastenings through the shoe upper into the insole.

40. A fastening inserting machine having a work support, a head, a gang of fastening inserting instrumentalities carried by the head and arranged to insert fastenings into a work piece on the support, said head being pivotally mounted for swinging movement toward and from the work piece on the support, a clutch for transmitting power to the fastening inserting instrumentalities, a latch constructed and arranged to hold the head in inoperative position, a manually operable controller, connections between the controller and the latch through which displacement of the controller releases the latch and further movement of the controller swings the head from inoperative to operative position, means operated by power transmitted through the clutch for pressing the fastening inserting instrumentalities carried by the head firmly against the work piece and for thereafter operating the fastening inserting instrumentalities, and connections between the controller and the clutch arranged so that further displacement of the controller after the head has reached operative position trips the clutch and thereby presses the head against the work piece and then operates the fastening inserting instrumentalities.

41. A lasting machine having a support for a last on which are assembled an insole and a shoe upper, wiper mechanism for working the end portion of the upper into lasted relation to an end portion of the last and insole, a head, a gang of fastening inserting instrumentalities carried by the head and arranged to insert a row of fastenings peripherally of the end portion of the shoe to secure the shoe upper in lasted relation to the insole, said head being pivotally mounted for swinging movement toward and from the plane of the insole of a shoe on the support, a clutch for transmitting power to the fastening inserting instrumentalities, a latch constructed and arranged to hold the head in inoperative position, a hand lever carried by the head, connections between the hand lever and the latch whereby displacement of the hand lever releases the latch so that further movement of the hand lever is effective to swing the head from inoperative to operative position, means operated by power transmitted through the clutch for pressing the fastening inserting instrumentalities carried by the head firmly against the bottom of the shoe and for thereafter operating the fastening inserting instrumentalities, and connections between the hand lever and the clutch arranged so that further displacement of the hand lever after the head has reached operative position trips the clutch and thereby presses the head against the shoe bottom and then operates the fastening inserting instrumentalities.

42. A fastening inserting machine having a work support arranged to receive a work piece into which one or more fastenings are to be inserted, a head mounted for swinging movement to and from operative position, fastening inserting mechanism carried by the head, a latch arranged to hold the head in inoperative position, a controller which when displaced is effective first to release the latch and thereafter may be used to swing the head from inoperative to operative position, a clutch and connections from the controller to the clutch constructed and aranged to cause the clutch to be tripped by movement of the controller after the head is in operative position, means operated by the clutch for forcing the head against the work piece on the work support and for clamping the head in operative position against the work piece, and connections between the clutch and the fastening inserting mechanism by which the latter is operated after the head has been clamped in operative position.

43. A lasting machine having a support arranged to receive a last on which is assembled an insole and a shoe upper, means for working an end portion of the shoe upper into lasted relation to the last and insole, a head mounted for swinging movement to and from operative position, fastening inserting mechanism carried by the head, a latch arranged to hold the head in inoperative position, a controller which when displaced is effective first to release the latch and thereafter may be used to swing the head from inoperative to operative position, a clutch, connections from the controller to the clutch constructed and arranged to cause the clutch to be tripped by movement of the controller after the head is in operative position, means operated by the clutch for forcing the head against the shoe on the support and for clamping the head in operative position against the shoe, and connections between the clutch and the fastening inserting mechanism by which the fastening inserting mechanism is operated after the head has been clamped in operative position.

44. A fastening inserting machine having a work support arranged to receive a last on which is assembled an insole and a shoe upper, means for working an end portion of the shoe upper into lasted relation to the last and insole, a head mounted for swinging movement, fastening inserting mechanism carried by the head, a clutch arranged when tripped to transmit power to the fastening inserting mechanism, a handle attached to the head by which the operator swings the head from an inoperative position remote from the shoe to operative position in which the fastening inserting mechanism is in juxtaposition to the end of the shoe, and connections from the handle to the clutch constructed and arranged to cause the clutch to be tripped by further movement of the handle after the head is in operative position thereby operating the fastening inserting mechanism to insert fastenings through the shoe upper into the insole to retain the upper in lasted relation to the insole.

45. A lasting machine having a support for a last on which are assembled an insole and a shoe upper, means for working an end portion of the shoe upper into lasted relation to the last and insole, a head carrying fastening inserting mechanism and arranged to be swung from an inoperative position remote from the shoe to an operative position in engagement with the shoe, a manually operable controller, a clutch, and connections between the head, the controller and the clutch constructed and arranged to cause the clutch to be tripped by movement of the controller, after the head is in operative position, thereby to force the head firmly against the shoe and to lock the head rigidly in that position and subsequently to operate the fastening inserting means.

46. A lasting machine having a support for a last on which are assembled an insole and a shoe upper, means for working an end portion of the shoe upper into lasted relation to the last and insole, fastening inserting mechanism constructed and arranged to be swung from an inoperative position remote from the shoe to operative position in engagement with the shoe, a clutch, means operated by power transmitted by the clutch to lock the head rigidly in position relatively to the shoe, a controller, connections from the controller to the clutch constructed and arranged to cause the clutch to be tripped by movement of the controller after the head is in operative position thereby to lock the head rigidly in position relative to the shoe and subsequently to operate the fastening inserting means to insert fastenings through the shoe upper into the insole thereby maintaining the upper in lasted relation to the insole.

47. A lasting machine having a support for a last on which are assembled an insole and a shoe upper, means for working an end portion of the shoe upper into lasted relation to the last and insole, a head carrying fastening inserting mechanism and arranged to be swung through substantially a right angle from an inoperative position remote from the shoe to operative position in engagement with the shoe, said head being provided with a handle by which it may be swung into operative position, means operable to lock the head in operative position, a clutch, and connections from the handle to the clutch constructed and arranged to cause the clutch to be tripped by further movement of the handle after the head is in operative position thereby to operate the head locking mechanism thus holding the head rigidly in position relatively to the shoe and subsequently to operate the fastening inserting means.

48. A lasting machine having a support for a last on which are assembled an insole and a shoe upper, means for working an end portion of the shoe upper into lasted relation to the last and insole, a head carrying fastening inserting mechanism and mounted for movement from an inoperative position remote from the shoe to an operative position in engagement with the shoe, a controller, a clutch, and connections between the controller, the clutch and the fastening inserting mechanism operating upon displacement of the controller, when the head is in operative position, to trip the clutch and thereby to operate the fastening inserting mechanism to insert a row of fastenings through the shoe upper into the sole thereby to maintain the upper in lasted relation to the insole.

49. A lasting machine having a frame, a support carried by the frame for a last on which are assembled an insole and a shoe upper, means for working the toe portion of the shoe upper into lasted relation to the last and insole, a head carrying fastening inserting mechanism and mounted on the frame to be moved from an inoperative position remote from the shoe to an operative position in engagement with the shoe, a hand lever, a clutch, and connections between the hand lever, the clutch and the fastening inserting mechanism inoperative except when the head is in operative position but then operative upon displacement of the hand lever to trip the clutch and thereby to operate the fastening inserting mechanism to insert a row of fastenings through the shoe upper into the sole thereby to maintain the upper in lasted relation to the insole.

50. A fastening inserting machine having a support for a work piece, a head mounted to be moved from an inoperative position remote from the work support into operative position in engagement with a work piece on the support, a latch arranged to hold the head in inoperative position, a hand lever, a clutch, and connections between the hand lever and the latch, the hand lever and the clutch, and the clutch and the fastening inserting mechanism effective when the hand lever is displaced first to release the latch thereby permitting the head to be moved into operative position and, when the head reaches operative position, to trip the clutch and thereby to operate the fastening inserting mechanism to insert fastenings into the work piece.

51. A lasting machine having a support for a last on which are assembled an insole and a shoe upper, means for working the shoe upper into lasted relation to the last and insole, a head mounted to be moved from an inoperative position remote from the work support into operative position in engagement with a shoe on the support, a latch arranged to hold the head in inoperative position, fastening inserting mechanism carried by the head, a hand lever, a clutch, and connections between the hand lever and the latch, the hand lever and the clutch, and the clutch and the fastening inserting mechanism effective when the hand lever is displaced first to release the latch thereby permitting the head to be moved into operative position and, when the head reaches operative position, to trip the clutch and thereby to operate the fastening inserting mechanism to insert fastenings through the shoe upper into the insole to hold the upper in lasted relation to the insole.

52. A lasting machine having a support for a last on which are assembled an insole and a shoe upper, wiper mechanism for working an end portion of the shoe upper into lasted relation to the last and insole, a head, fastening inserting mechanism carried by the head, said head being arranged to be swung through substantially a right angle from an inoperative position remote from the shoe to operative position in engagement with the shoe and provided with a handle by which it may be swung, a clutch, connections from the handle to the clutch constructed and arranged to cause the clutch to be tripped by further movement of the handle after the head is in operative position and thereby to lock the head rigidly in position relative to the shoe and subsequently to operate the fastening inserting means to insert a row of fastenings through the shoe upper and into the insole peripherally of the end of the shoe.

53. A fastening inserting machine having a work support arranged to receive a shoe in which fastenings are to be inserted, a head mounted for swinging movement to and from operative relation to the shoe on the support, fastening inserting mechanism carried by the head, a clutch arranged when tripped to transmit power to the fastening inserting mechanism, a controller, and connections from the controller to the clutch constructed and arranged to cause movement of the controller to have no effect on the clutch when the head is in inoperative position but to cause the clutch to be tripped by movement of the controller after the head is in operative position, mechanism constructed and arranged to force the head toward the shoe on the work support through power applied by the clutch immediately after it is tripped and to lock the head against movement away from the shoe on the support, and means for thereafter operating the fastening inserting mechanism to insert fastenings into the shoe.

54. A lasting machine having a work support arranged to receive a last on which are assembled a shoe upper and insole, means for working the shoe upper into lasted relation to the last and insole, a head mounted for movement to and from operative relation to the shoe on the support, a latch operative to hold the head in inoperative position, fastening inserting mechanism carried by the head, a clutch arranged when tripped to transmit power to the fastening inserting mechanism, a controller and connections from the controller to the clutch constructed and arranged to cause movement of the controller to have no effect on the clutch when the head is in inoperative position but to cause the clutch to be tripped by movement of the controller after the head is in operative position, mechanism constructed and arranged to press the head against the shoe on the work support through power applied by the clutch immediately after it is tripped and to lock the head against movement away from the shoe, and means for thereafter operating the fastening inserting mechanism to insert fastenings through the shoe upper into the insole to maintain the shoe upper in lasted position.

55. A lasting machine having a work support arranged to receive a last on which are assembled a shoe upper and insole, means for working the shoe upper into lasted relation to the last and insole, a head pivoted for swinging movement to and from operative relation to the shoe on the support, a latch operative to hold the head in inoperative position, fastening inserting mechanism carried by the head, a clutch arranged when tripped to transmit power to the fastening inserting mechanism, a controller and connections from the controller to the clutch constructed and arranged to cause movement of the controller to have no effect on the clutch when the head is in inoperative position but to cause the clutch to be tripped by movement of the controller after the head is in operative position, mechanism constructed and arranged to press the head against the shoe on the work support through power applied by the clutch immediately after it is tripped and to lock the head against movement away from the shoe, means for thereafter operating the fastening inserting mechanism to insert fastenings through the shoe upper into the insole to maintain the shoe upper in lasted position, and means arranged to cause the return of the head to inoperative position after the fastenings have been inserted.

56. A fastening inserting machine having a work support arranged to receive a shoe in which fastenings are to be inserted, a head mounted for swinging movement to and from operative relation to the shoe on the support, fastening inserting mechanism carried by the head, a clutch arranged when tripped to transmit power to the fastening inserting mechanism, a controller, and connections from the controller to the clutch constructed and arranged to cause movement of the controller to have no effect on the clutch when the head is in inoperative position but to cause the clutch to be tripped by movement of the controller after the head is in operative position, and means to hold the head against movement away from the shoe on the support until after the operation of the fastening inserting mechanism to insert fastenings into the shoe.

57. A fastening inserting machine having a tool operating alternately as an awl and as a driver, a lever connected to the tool and arranged by its rocking to reciprocate the tool, means for rocking the lever about its fulcrum, and means for controlling the stroke of the tool comprising an eccentric to which the lever is fulcrumed and means for rocking the eccentric thereby moving the fulcrum point of the lever and changing the operative stroke of the tool.

58. A fastening inserting machine having a tool carrier, a gang of tools secured to said carrier and arranged to act both as awls and as drivers, a lever connected to said carrier, means for rocking the lever about its fulcrum thereby reciprocating the tool carrier, an eccentric serving as the fulcrum for the lever, and means for rocking the eccentric thereby varying the fulcrum point of the lever and changing the path of reciprocation of the tool carrier according as the tools are to serve as awls or as drivers.

59. A fastening inserting machine having a tool constructed and arranged to operate alternately as an awl and as a driver, a lever connected at one end to said tool, an eccentric serving as a fulcrum for the lever, means for rocking the lever connected to the end of the lever remote from the tool, and means for rotating the eccentric through part of a revolution between successive operating strokes of the tool thereby varying the stroke of the tool and giving it alternately work penetrating strokes by which it acts as an awl to form holes in the work and driver strokes by which it inserts fastenings in the holes.

60. A fastening inserting machine having a tool acting alternately as an awl and as a driver, a lever connected to said tool, an eccentric serving as a fulcrum for said lever, means for rotating the eccentric through part of a revolution and then causing it to come to rest thereby moving the point at which the lever is fulcrumed and varying the stroke of the tool to give the tool an awl stroke when the eccentric is in one of its positions and a driver stroke when the eccentric is in another of its positions.

61. A fastening inserting machine having a tool operating alternately as an awl and as a driver, a lever connected to the tool and arranged by its rocking to reciprocate the tool, a cam and a spring co-operating to rock the lever about its fulcrum, and means for controlling the stroke of the tool comprising an eccentric to which the lever is fulcrumed and means for rocking the eccentric thereby moving the fulcrum point of the lever and changing the operative stroke of the tool according as it is to act as an awl and as a driver.

62. A fastening inserting machine having a tool carrier, a tool secured to said carrier and arranged to act both as an awl and as a driver, a bell-crank lever connected to said carrier, an eccentric arranged to act as the fulcrum of said lever, means for rocking the bell-crank lever thereby reciprocating the tool, and means for rocking the eccentric thereby varying the fulcrum point of the lever and changing the path of reciprocation of the tool carrier according as the tool is to serve as an awl or as a driver.

63. A fastening inserting machine having a tool carrier, a tool carried by the carrier and constructed and arranged to operate alternately as an awl and as a driver, a bell-crank lever connected at one end to said tool carrier, an eccentric serving as a fulcrum for the bell-crank lever, means connected to the other end of the bell-crank lever for rocking the lever, and means for rotating the eccentric through part of a revolution between successive operating strokes of the tool thereby varying the stroke of the tool and giving it alternately work penetrating strokes in which it acts as an awl to form holes in the work and driver strokes by which it inserts fastenings in the holes.

64. A fastening inserting machine having a carrier, a gang of tools secured to said carrier and arranged to operate both as awls and as drivers, a lever connected at one end to said carrier and fulcrumed between its ends, means connected to the other end of the lever for rocking the lever about its fulcrum thereby reciprocating the tool carrier, an eccentric serving as a fulcrum for the lever, and means for rocking the eccentric in each cycle of operation of the machine to change the path of reciprocation of the tool carrier and the tools carried thereby according as the tools are acting as awls or as drivers.

65. A fastening inserting machine having a reciprocable driver bar, a gang of drivers carried thereby, an eccentric, cyclically operated means for rocking said eccentric, a bell-crank lever fulcrumed on the eccentric and connected at one end to the driver bar, a lifting block secured to the other end of the bell-crank lever, a cam mounted on a shaft adjacent to the lifting block and provided with a pair of lifting members arranged as the shaft is rotated alternately to lift the lifting block, a frame member connected to the bell-crank lever adjacent to the lifting block and straddling the shaft, a stiff compression spring urging the frame member in a direction to force the lifting block toward the cam, connections between the eccentric and the cam shaft such that the eccentric is rocked from one extreme position to the other after each of the rocking movements of the bell-crank lever which are caused by the action of the compression spring when a lifting member of the cam passes out from under the lifting block of the bell-crank lever, so that the drivers are given alternately a long stroke, at which time they serve as awls, and a short stroke, at which time they act as drivers.

66. A fastening inserting machine having a reciprocable driver bar, a gang of drivers carried thereby, an eccentric, cyclically operated means for rocking said eccentric, a bell-crank lever fulcrumed on the eccentric and connected at one end to the driver bar, a lifting block secured to the other end of the bell-crank lever, a cam mounted on a shaft adjacent to the lifting block and provided with a pair of lifting members arranged as the shaft is rotated alternately to lift the lifting block, a frame-like member connected to the bell-crank lever adjacent to the lifting block straddling the shaft and carrying a projecting rod carrying at the end thereof an abutment, a stiff compression spring surrounding the rod and bearing at one end against said abutment, a stationary member connected to the frame of the machine and forming an abutment for the other end of the spring, another cam on the cam shaft, connections between the eccentric and the last-named cam constructed and arranged to rock the eccentric from one extreme position to the other between each two successive rocking movements of the bell-crank lever which are caused by the action of the compression spring when a lifting member of the cam passes out from under the lifting block of the bell-crank lever, whereby the drivers are given alternately a long stroke, at which time they serve as awls, and a short stroke, at which time they act as drivers.

67. A fastening inserting machine having a work support arranged to receive a shoe into which fastenings are to be inserted, a head provided with fastening inserting mechanism and constructed and arranged to be moved to an inoperative position remote from the work support and to an operative position in which the fastening inserting mechanism engages a shoe upon the support, means for locking the head in operative position during the fastening inserting operation, and a reel carried by the head and constituting a source of supply of fastenings for the fastening inserting mechanism.

68. A lasting machine having a work support arranged to receive a last on which is assembled a shoe upper and insole, means for working the shoe upper into lasted relation to the last and insole, a head privided with fastening inserting mechanism for inserting fastenings to secure the upper in lasted relation to the insole and shoe upper and constructed and arranged to be swung from an inoperative position remote from the work support to an operative position in which the fastening inserting mechanism engages the overlasted portion of the upper of the shoe on the work support, means for locking the head in operative position, and a reel carried by the head and constituting a source of supply of fastenings for the fastening inserting mechanism.

69. A fastening inserting machine having a work support arranged to receive a shoe into which fastenings are to be inserted, a head provided with fastening inserting mechanism and pivoted to be swung to an inoperative position remote from the work support and to an operative position in which the fastening inserting mechanism engages a shoe upon the support, means for pressing and locking the head in operative position against the shoe during the fastening inserting operation, and a reel carried by the swinging head and constituting a source of supply of fastenings for the fastening inserting mechanism.

70. A fastening inserting machine having a work support arranged to receive a shoe into the sole of which fastenings are to be inserted, a head provided with gang fastening inserting mechanism having a plurality of fastening inserting drivers, said head being mounted for swinging movement to an inoperative position remote from the work support while a shoe is placed upon the work support and to an operative position in which the fastening inserting mechanism engages the bottom of the shoe on the support, means constructed and arranged to clamp the head against the shoe bottom during the fastening inserting operation, and a reel mounted on the swinging head carrying as many strips of fibre-fastening material as there are drivers in the fastening inserting mechanism and constituting a source of supply of fastenings for the fastening inserting mechanism.

FRED N. LA CHAPELLE.
FRED C. EASTMAN.